(12) United States Patent
Ishii et al.

(10) Patent No.: US 7,271,392 B2
(45) Date of Patent: Sep. 18, 2007

(54) IMAGE SENSING APPARATUS AND METHOD USING RADIATION

(75) Inventors: Takamasa Ishii, Saitama (JP); Minoru Watanabe, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/428,837

(22) Filed: Jul. 6, 2006

(65) Prior Publication Data

US 2006/0237655 A1    Oct. 26, 2006

Related U.S. Application Data

(63) Continuation of application No. 10/648,916, filed on Aug. 27, 2003.

(30) Foreign Application Priority Data

Aug. 27, 2002  (JP) .............................. 2002-247249
Jan. 27, 2003  (JP) .............................. 2003-017806

(51) Int. Cl.
    *G01T 1/24*    (2006.01)
(52) U.S. Cl. ................................. 250/370.14
(58) Field of Classification Search ........... 250/370.14, 250/370.08, 370.09, 370.11
    See application file for complete search history.

(56) References Cited

U.S. PATENT DOCUMENTS

| | | | |
|---|---|---|---|
| 4,471,378 A | 9/1984 | Ng | |
| 5,164,583 A | 11/1992 | Aichinger et al. | |
| 5,182,624 A * | 1/1993 | Tran et al. ..................... | 257/40 |
| 5,331,166 A | 7/1994 | Yamamoto et al. | |
| 5,448,613 A | 9/1995 | Haendle et al. | |
| 5,751,783 A | 5/1998 | Granfors et al. | |
| 5,777,335 A | 7/1998 | Mochizuki et al. | |
| 5,877,501 A | 3/1999 | Ivan et al. | |
| 5,937,027 A | 8/1999 | Thevenin et al. | |
| 6,075,256 A | 6/2000 | Kaifu et al. | |
| 6,198,800 B1 | 3/2001 | Garland et al. | |
| 6,208,710 B1 | 3/2001 | Nagai | |

(Continued)

FOREIGN PATENT DOCUMENTS

EP        1048268 B1    11/2000

(Continued)

*Primary Examiner*—Constantine Hannaher
*Assistant Examiner*—Marcus H Taningco
(74) *Attorney, Agent, or Firm*—Morgan & Finnegan LLP

(57) ABSTRACT

This invention is to provide a radiation image sensing apparatus capable of automatically adjusting an incident radiation dose without requiring high-speed driving while suppressing any attenuation of the radiation before detection, and a method of manufacturing the same. To accomplish this, a read TFT (1) is formed on an insulating substrate (11). The semiconductor layer (19) and $n^+$-semiconductor layer (20) of an MIS photoelectric conversion element (2) are formed on a second insulating layer (18) that covers the read TFT (1) to be aligned with source and drain electrodes (16) functioning as lower electrodes. The semiconductor layer (21) of a TFT sensor (3) is formed to be aligned with a gate electrode (17) when viewed from the upper side. The semiconductor layers (19, 21) are formed from the same layer. The upper electrode (22) of the MIS photoelectric conversion element (2) is formed on the $n^+$-semiconductor layer (20). Two ohmic contact layers (23) are formed on the semiconductor layer (21). Source and drain electrodes (24) are formed on the two ohmic contact layers (23), respectively.

7 Claims, 29 Drawing Sheets

U.S. PATENT DOCUMENTS

| | | |
|---|---|---|
| 6,323,490 B1 | 11/2001 | Ikeda et al. |
| 6,353,228 B1 | 3/2002 | Itabashi |
| 6,404,851 B1 | 6/2002 | Possin et al. |
| 6,423,973 B2 | 7/2002 | Choo et al. |
| 6,515,286 B2 | 2/2003 | Kuwabara |
| 6,643,411 B2 | 11/2003 | Nonaka |
| 6,895,078 B2 | 5/2005 | Alving et al. |
| 2001/0028701 A1 | 10/2001 | Schulz |
| 2002/0054659 A1 | 5/2002 | Okumura et al. |
| 2002/0101960 A1 | 8/2002 | Nokita |
| 2002/0109097 A1 | 8/2002 | Tashiro |

FOREIGN PATENT DOCUMENTS

| | | |
|---|---|---|
| WO | WO 02/25314 A1 | 3/2002 |

* cited by examiner

IMAGE SENSING APPARATUS AND METHOD USING RADIATION

This application is a continuation of application Ser. No. 10/648,916, which was filed on Aug. 27, 2003 and which is hereby incorporated by reference in its entirety herein. This application claims the benefit of foreign priority based on Japanese Patent Application No. 2002-247249, filed on Aug. 27, 2002, and 2003-017806, filed on Jun. 30, 2003, each of which is hereby incorporated by reference in its entirety herein.

FIELD OF THE INVENTION

The present invention relates to a radiation image sensing apparatus suitable for a medical image diagnostic apparatus, a nondestructive inspection apparatus, and an analyzing apparatus using radiation and a method of manufacturing the radiation image sensing apparatus.

BACKGROUND OF THE INVENTION

A typical radiation image sensing apparatus that has conventionally been used is an apparatus that combines a photosensor having a MIS-TFT structure constructed by a MIS photoelectric conversion element and a switching TFT and a phosphor to convert radiation into visible light. In this specification, radiation includes not only α-rays, β-rays, and γ-rays but also electromagnetic waves such as visible light and X-rays.

FIG. 9 is an equivalent circuit diagram showing the circuit arrangement of a conventional radiation image sensing apparatus. FIG. 10 is a plan view showing the layout structure in the conventional radiation image sensing apparatus.

As an example of a radiation image sensing apparatus, one photoelectric conversion element (semiconductor conversion element) and one thin film transistor (TFT) are arranged for each pixel. More specifically, a pixel on the ath row and bth column from the upper side in FIGS. 9 and 10 has one photoelectric conversion element Mba and one thin film transistor Tba (a, b=1, 2, 3, 4).

Four photoelectric conversion elements arranged on the bth column are connected to a common bias line Vsb so that a predetermined bias is applied from a reading unit. The gate electrodes of four TFTs arranged on the ath row are connected to a common gate line Vga so that the gates are ON/OFF-controlled by a gate driving unit. The source electrodes or drain electrodes of the four TFTs arranged on the bth column are connected to a common signal line Sigb. Signal lines Sig1 to Sig4 are connected to the reading unit.

A phosphor layer that converts X-rays into visible light is formed on the irradiation surface of the radiation image sensing apparatus.

X-rays that irradiate an object such as a human body to be inspected on the radiation image sensing apparatus pass through the object to be inspected while being attenuated by it. The X-rays are converted into visible light by the phosphor layer. The visible light strikes the photoelectric conversion element and is converted into charges. The charges are transferred to a signal line through TFTs in accordance with a gate driving pulse applied from the gate driving unit and output to the outside through the reading unit. After that, charges that are generated by the photoelectric conversion element and remain there without being transferred are removed through the common bias line. This operation is called "refresh".

FIG. 11 is a sectional view showing the layer structure of one pixel of a photosensor having a conventional MIS-TFT structure. FIG. 11 shows a photosensor in which a MIS photoelectric conversion element and a switching TFT are formed in parallel.

An MIS photoelectric conversion element 1001 and switching TFT 1002 are formed on an insulating substrate 1011. The MIS photoelectric conversion element 1001 has a lower electrode 1017, insulating layer 1018, semiconductor layer 1019, $n^+$-semiconductor layer 1020, and upper electrode 1022. The switching TFT 1002 has a gate electrode 1012 gate insulating layer 1013, semiconductor layer 1014, ohmic contact layer 1015, and two, source and drain electrodes 1016.

The lower electrode 1017 and gate electrode 1012 are formed from the same electrode layer. The insulating layer 1018 and gate insulating layer 1013 are formed from the same insulating layer. The semiconductor layer 1019 and semiconductor layer 1014 are formed from the same semiconductor layer. The upper electrode 1022 and source and drain electrodes 1016 are formed from the same electrode layer.

The lower electrode 1017 of the MIS photoelectric conversion element 1001 is connected to one of the source and drain electrodes 1016 of the switching TFT 1002. The upper electrode 1022 is connected to a bias line. The other of the source and drain electrodes 1016 is connected to a signal line. The gate electrode 1012 is connected to a gate line. An insulating layer (protective layer) 1025, organic protective layer 1026, adhesive layer 1027, and phosphor layer 1028 are formed on the elements.

An X-ray automatic exposure controller (AEC) which automatically controls exposure of X-rays emitted from an X-ray source in the radiation image sensing apparatus will be described next.

Generally, in a radiation image sensing apparatus having two-dimensionally arrayed sensors, the dose of incident X-rays must be adjusted (AEC-controlled) for each object to be inspected or every imaging. X-ray dose adjustment methods can be classified into two methods.

(1) An AEC sensor is arranged independently of the radiation image sensing apparatus.

(2) An X-ray dose is read out from all or some of the image sensors in the radiation image sensing apparatus at a high speed, and the read signal is used as an AEC signal.

Conventionally, when the method (1) is employed, a plurality of thin AEC sensors which attenuate X-rays by about 5% are separately arranged in front of the radiation image sensing apparatus, i.e., on the detected object side of the phosphor layer of the radiation image sensing apparatus. X-ray exposure is stopped on the basis of the outputs from these AEC sensors, thereby obtaining an appropriate X-ray dose for imaging. As an AEC sensor used in this method, a sensor which directly extracts X-rays as charges by using an ion chamber, or a sensor which extracts phosphor light through a phosphor by using a fiber and causes a photomultiplier to convert the light into charges is used.

However, when AEC sensors are separately prepared in the radiation image sensing apparatus in which sensors are two-dimensionally arrayed to adjust (AEC-control) an incident radiation dose, the layout of the sensors poses a problem.

Generally, information necessary for AEC is present at the center of an object. If AEC sensors should be laid out without impeding image sensing by image sensing sensors, AEC sensors that attenuate radiation by only a minimum amount must be independently arranged, resulting in an increase in cost of the entire apparatus. In addition, there are no sensors that do not attenuate radiation at all. Hence, the quality of a sensed image inevitably degrades.

The method that uses image sensing sensors in the radiation image sensing apparatus as AEC sensors poses no serious problem for sensors with a relatively small number of pixels. However, when the number of pixels is, e.g., 2,000×2,000, a high-speed driving circuit is necessary, resulting in an increase in cost of the entire apparatus. Since high-speed driving is necessary, it is difficult to sufficiently ensure the charge storage time, charge transfer time, and capacitor reset time in the image sensing sensors. As a result, the quality of a sensed image degrades.

Contrary to this arrangement, U.S. Pat. No. 5,448,613 discloses an arrangement in which a second pixel group is arranged in a sensor substrate and driven by a shift register different from that for an image read sensor to detect the integration of signal charges.

However, when this arrangement is simply employed, some of image read pixels are replaced with second pixels. Accordingly, the opening ratio of pixels related to image reading with respect to all the pixels decreases. In addition, lead interconnections must be prepared separately for the first pixels and second pixels. This may complicate the interconnection structure.

Hence, there is still room for improvement in the arrangement of the above prior art in association with the pixel layout and interconnection structure.

SUMMARY OF THE INVENTION

Accordingly, the present invention is conceived as a response to the above-described disadvantages of the conventional art.

According to one aspect of the present invention, preferably, an image sensing apparatus is characterized by comprising a substrate, a conversion section which is arranged on the substrate and has a first semiconductor conversion element that converts radiation into an electrical signal and a switch element connected to the first semiconductor conversion element, and a second semiconductor conversion element which is arranged on the substrate to detect a total dose of radiation incident on the conversion section and converts the radiation into an electrical signal, wherein the first semiconductor conversion element and the second semiconductor conversion element have semiconductor layers formed from the same layer.

According to the other aspect of the present invention, preferably, a radiation image sensing apparatus is characterized by comprising a substrate, a conversion section which is arranged on the substrate and has a first photoconductive element, a capacitive element connected to the first photoconductive element, and a switch element connected to the capacitive element, and a second photoconductive element which is arranged on the substrate to detect a total dose of radiation incident on the conversion section, wherein the first photoconductive element and the second photoconductive element have photoconductive layers formed from the same layer.

According to still other aspect of the present invention, preferably, a method of manufacturing a radiation image sensing apparatus having a substrate, a conversion section which is arranged on the substrate and has a first semiconductor conversion element that converts radiation into an electrical signal and a switch element connected to the first semiconductor conversion element, and a second semiconductor conversion element which is arranged on the substrate to detect a total dose of radiation incident on the conversion section and converts the radiation into an electrical signal is characterized by comprising steps of forming the switch element on the substrate, and forming a semiconductor layer of the first semiconductor conversion element and a semiconductor layer of the second semiconductor conversion element simultaneously from the same layer.

According to still other aspect of the present invention, preferably, a method of manufacturing a radiation image sensing apparatus having a substrate, a conversion section which is arranged on the substrate and has a first photoconductive element, a capacitive element connected to the first photoconductive element, and a switch element connected to the capacitive element, and a second photoconductive element which is arranged on the substrate to detect a total dose of radiation incident on the conversion section is characterized by comprising steps of forming the switch element and the switch on the substrate, and forming a photoconductive layer of the first photoconductive element and a photoconductive layer of the second photoconductive element from the same layer.

In the present invention, AEC can be executed on the basis of a radiation dose detected through the second semiconductor conversion element or second photoconductive element. The second semiconductor conversion element or second photoconductive element is formed on the same substrate as that of the first semiconductor conversion element or first photoconductive element. Hence, radiation is not attenuated by the second semiconductor conversion element or second photoconductive element. In addition, since the first semiconductor conversion element or first photoconductive element need not be used for automatic control, the element need not be driven at a high speed.

Other features and advantages of the present invention will be apparent from the following description taken in conjunction with the accompanying drawings, in which like reference characters designate the same or similar parts throughout the figures there.

DETAILED DESCRIPTION OF THE PREFERRED EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 12:
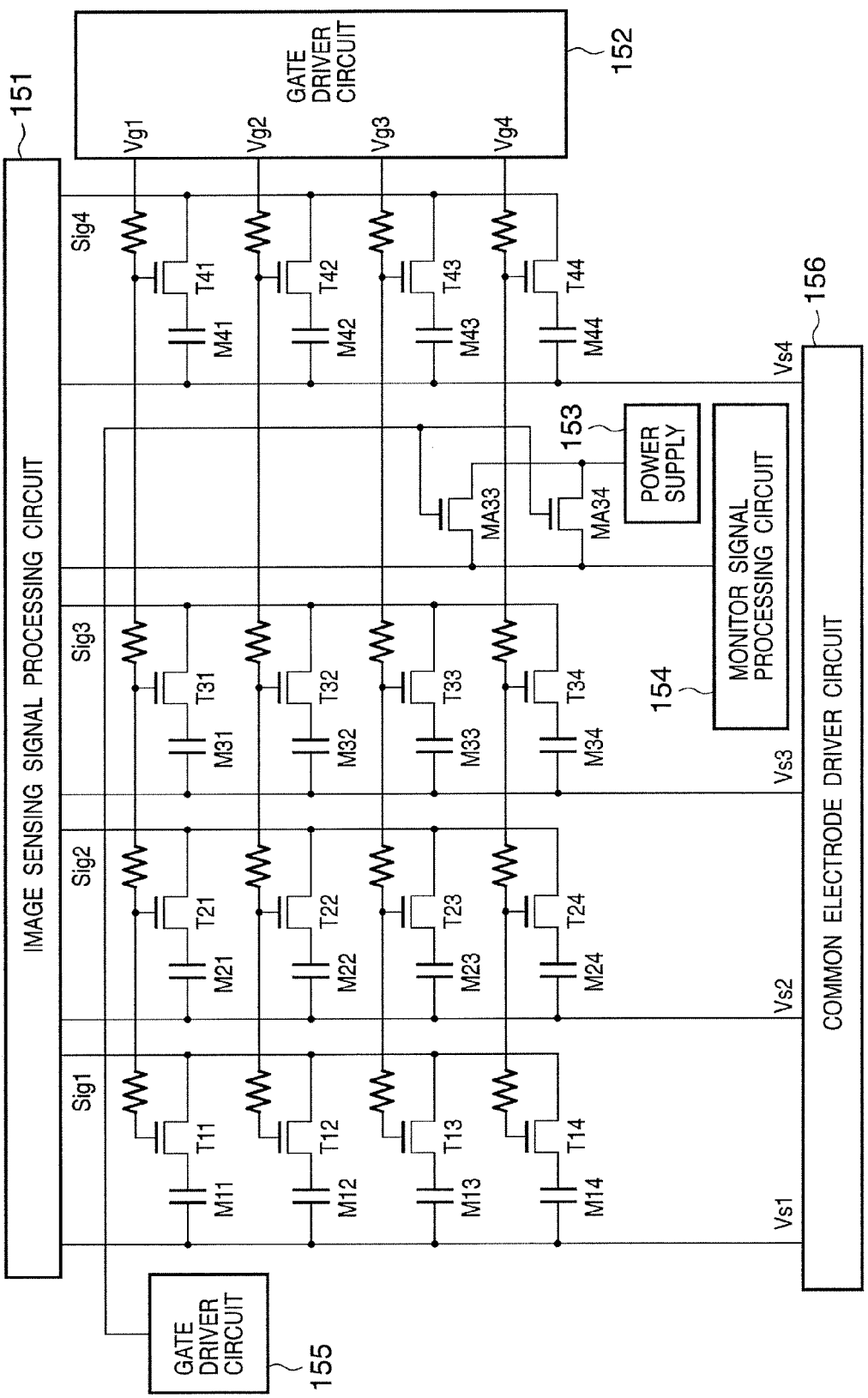
FIG. 12 is an equivalent circuit diagram showing the circuit arrangement of a radiation image sensing apparatus according to a reference example.
Figure 13:
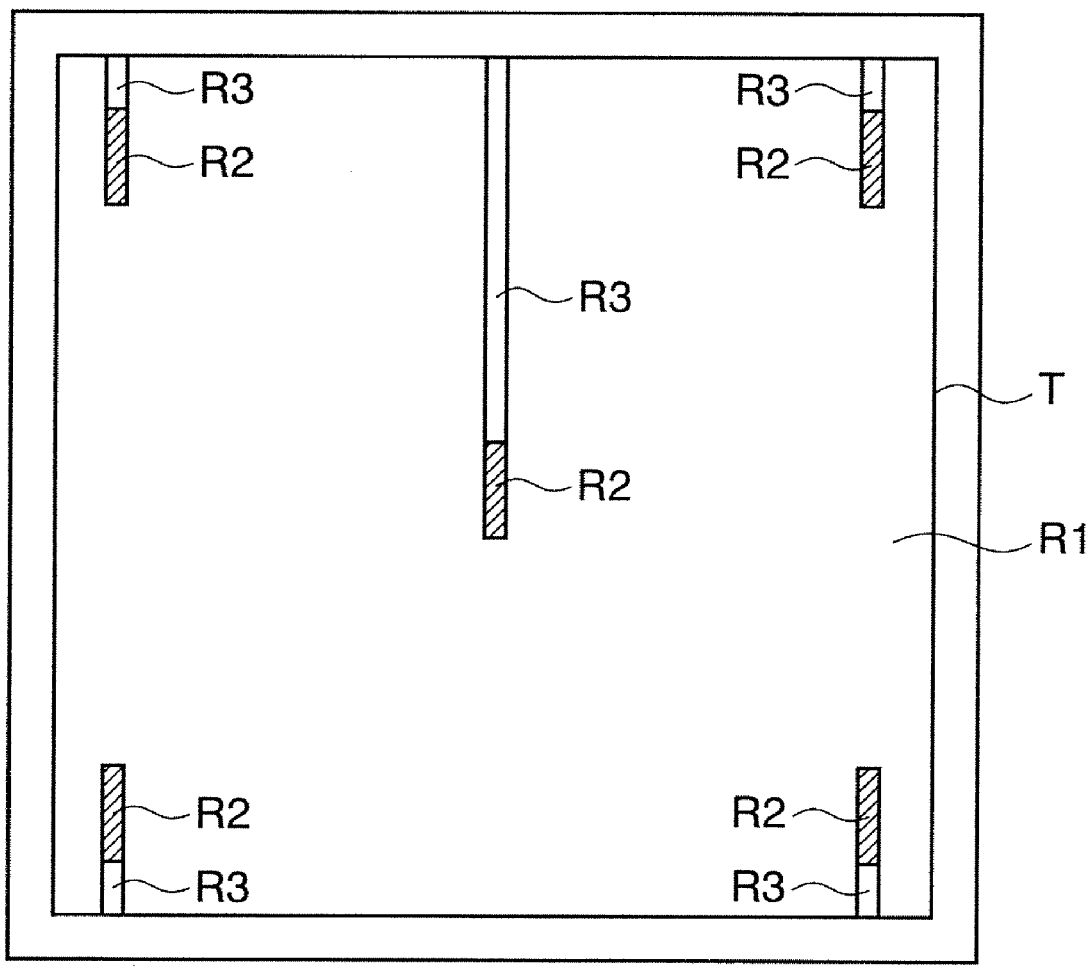
FIG. 13 is a layout diagram showing the overall arrangement of the radiation image sensing apparatus according to the reference example.

The embodiments of the present invention will be described below in detail with reference to the accompanying drawings. A reference example will be described for the sake of understanding of the present invention. This reference example is based on the description of U.S. Pat. No. 5,448,613 described above. FIG. 12 is an equivalent circuit diagram showing the circuit arrangement of a radiation image sensing apparatus according to the reference example. FIG. 13 is a layout diagram showing the overall arrangement of the radiation image sensing apparatus according to the reference example. FIG. 12 shows an example in which 4 (rows)×4 (columns) (=a total of 16) pixels are arranged in a pixel area. However, the number of pixels is not limited to this.

In this reference example, a combination of an image sensing photoelectric conversion element (first photoelectric conversion element) and a switching thin film transistor (TFT) or a combination of an image sensing photoelectric conversion element, switching TFT, and monitor photoelectric conversion element (second photoelectric conversion element) for AEC is arranged for each pixel. More specifically, a pixel on the ath row and the bth column from the upper side in FIG. 12 has one image sensing photoelectric conversion element Mba and one switching thin film transistor Tba (a, b=1, 2, 3, 4). The pixels on the fourth column and the third and fourth rows respectively have monitor photoelectric conversion elements MA43 and MA44. The pixels on the fourth column and the first and second rows respectively have lead interconnections for the monitor photoelectric conversion elements.

The four image sensing photoelectric conversion elements arranged on the bth column are connected to a common bias line Vsb so that a predetermined bias is applied from a common electrode driver circuit 156. The gate electrodes (control electrodes) of the four switching TFTs arranged on the ath row are connected to a common gate line Vga so that the gates are ON/OFF-controlled by a gate driver circuit 152. The source electrodes or drain electrodes of the four switching TFTs arranged on the bth column are connected to a common signal line Sigb. Signal lines Sig1 to Sig4 are connected to an image sensing signal processing circuit 151. Arrays of pixels arranged in the direction in which the bias lines run will be referred to as "columns". Arrays of pixels arranged in a direction (the direction in which gate lines run) perpendicular to the columns will be referred to as "rows".

The monitor photoelectric conversion elements MA33 and MA34 are TFT sensors. Their source electrodes are connected to a power supply 153, their drain electrodes are connected to a monitor signal processing circuit 154, and their gate electrodes (control electrodes) are connected to the gate driver circuit 152. In a TFT sensor, electrons and holes generated in a semiconductor layer when visible light becomes incident on it are read in accordance with an electric field between the source and the drain. That is, when a voltage is applied from the power supply 153 to each source electrode to apply a potential between the source and the drain, electrons and holes generated when the light-receiving portion between the electrodes is irradiated with light are transported to each electrode by the potential difference between the source and the drain. When the charges are read in real time by the monitor signal processing circuit 154, the light irradiation amount can be measured.

When a circuit having the arrangement shown in FIG. 12 is applied to a radiation image sensing apparatus having a number of pixels, a conversion section (pixel area) T includes an area R1 where a plurality of pixels each having an image sensing photoelectric conversion element and switching TFT are collectively laid out, areas R2 where a plurality of pixels each having an image sensing photoelectric conversion element, switching TFT, and monitor photoelectric conversion element are collectively laid out, and areas R3 where a plurality of pixels each having an image sensing photoelectric conversion element, switching TFT, and lead interconnection for a monitor photoelectric conversion element are collectively laid out, as shown in FIG. 13.

Figure 14:
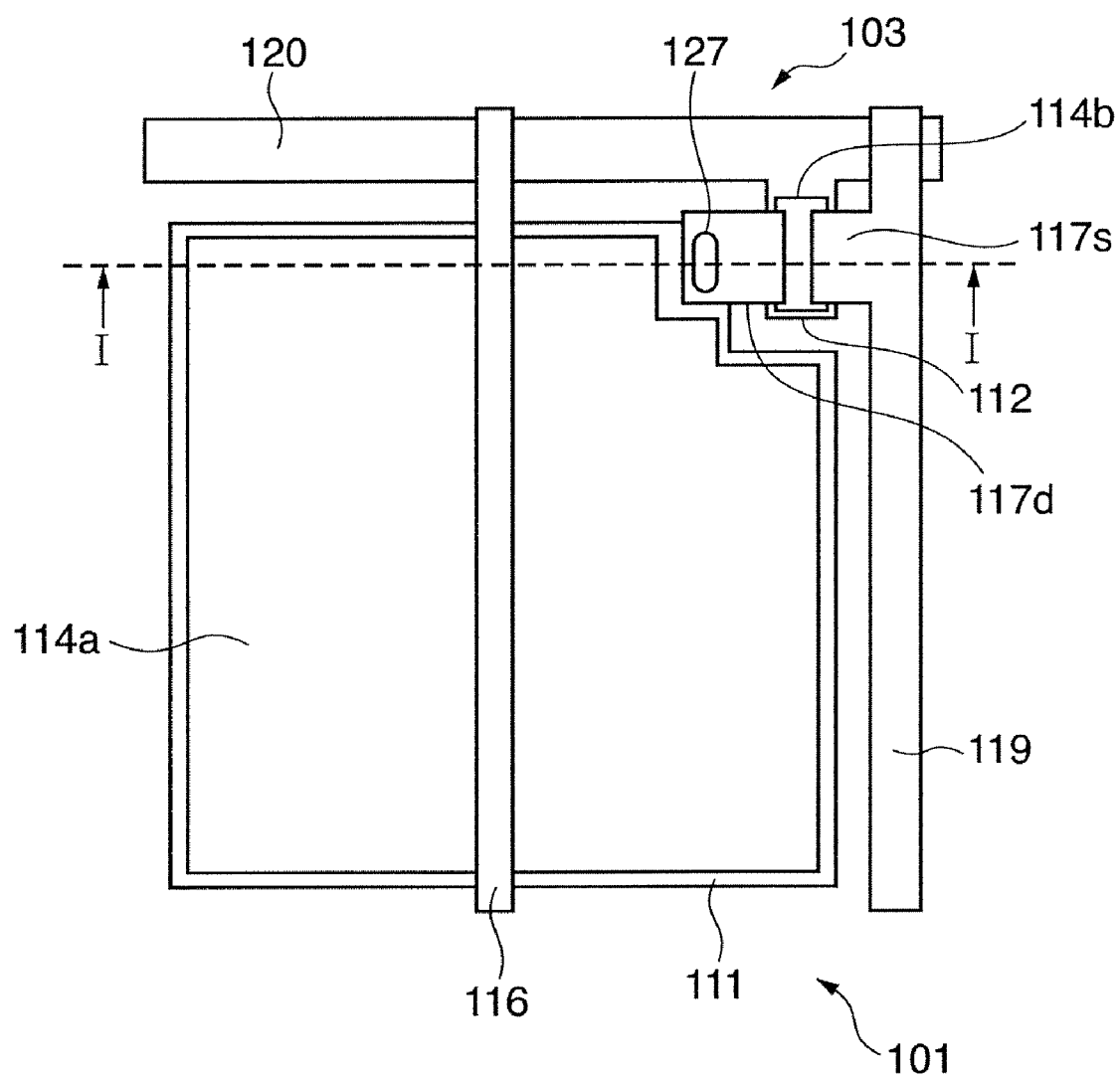
FIG. 14 is a layout diagram showing the planar structure of a pixel of the radiation image sensing apparatus according to the reference example, which has neither a monitor photoelectric conversion element nor lead interconnections therefor.
Figure 15:
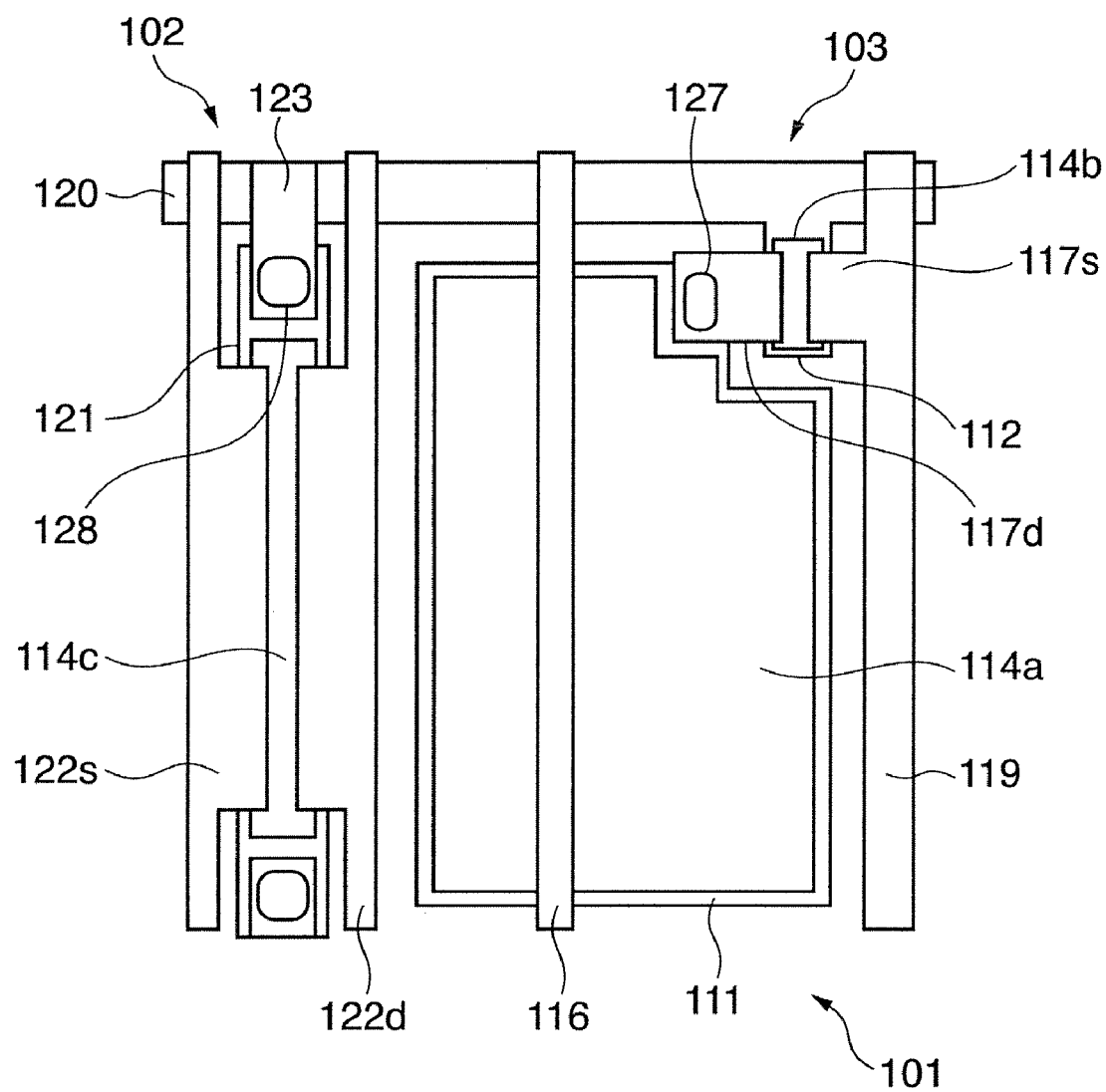
FIG. 15 is a layout diagram showing the planar structure of a pixel of the radiation image sensing apparatus according to the reference example, which has a monitor photoelectric conversion element.
Figure 16:
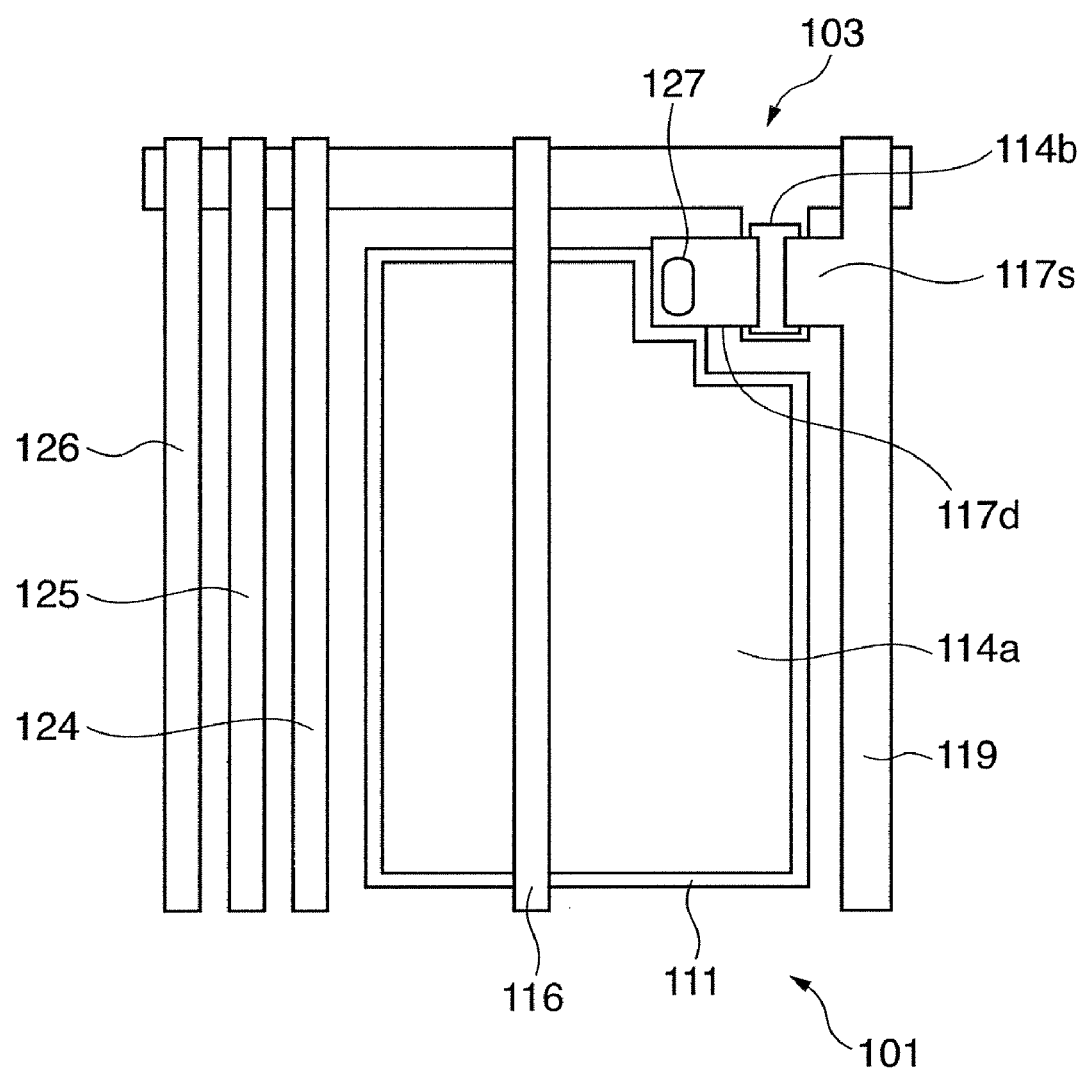
FIG. 16 is a layout diagram showing the planar structure of a pixel of the radiation image sensing apparatus according to the reference example, which has lead interconnections for a monitor photoelectric conversion element.
Figure 17:
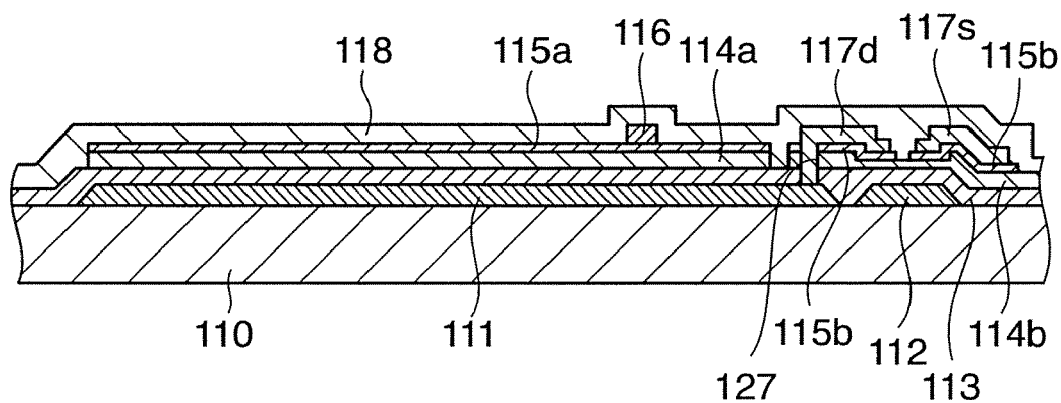
FIG. 17 is a sectional view taken along a line I-I in FIG. 14.

The planar structure of each of the three types of pixels in the reference example will be described next. FIG. 14 is a layout diagram showing the planar structure of a pixel of the radiation image sensing apparatus according to the reference example, which has neither a monitor photoelectric conversion element nor lead interconnections therefor. FIG. 15 is a layout diagram showing the planar structure of a pixel of the radiation image sensing apparatus according to the reference example, which has a monitor photoelectric conversion element. FIG. 16 is a layout diagram showing the planar structure of a pixel of the radiation image sensing apparatus according to the reference example, which has lead interconnections for a monitor photoelectric conversion element. FIG. 17 is a sectional view taken along a line I-I in FIG. 14. Referring to FIGS. 14 to 16, a semiconductor layer is illustrated inside a control electrode that is present under the semiconductor layer for the illustrative convenience. In this reference example, the semiconductor layer or photoelectric conversion layer is formed to be wider than the control electrode that is present under the semiconductor layer or photoelectric conversion layer, and a first insulating film is present under the semiconductor layer or photoelectric conversion layer, as shown in FIGS. 14 and 17. This also applies to the remaining layout diagrams.

In the pixel which has neither a monitor photoelectric conversion element nor lead interconnections therefor, a sensor electrode 111 of an image sensing photoelectric conversion element 101, a control electrode (gate electrode) 112 of a switching TFT 103, and a first insulating film 113 that covers the sensor electrode 111 and control electrode 112 are formed on an insulating substrate 110, as shown in FIGS. 14 and 17.

On the first insulating film 113, a semiconductor layer (photoelectric conversion layer) 114a and ohmic contact layer 115a are sequentially stacked to be aligned with the sensor electrode 111. A common electrode bias line 116 is formed on the ohmic contact layer 115a. The common electrode bias line 116 corresponds to bias lines Vs1 to Vs4 in FIG. 12.

Also, a semiconductor layer 114b is formed on the first insulating film 113 to be aligned with the control electrode 112. Ohmic contact layers 115b are formed at two portions on the semiconductor layer 114b. One ohmic contact layer 115b extends to a portion on the sensor electrode 111. A drain electrode 117d is formed on the ohmic contact layer 115b that extends to a portion on the sensor electrode 111. A source electrode 117s is formed on the other ohmic contact layer 115b. A through hole 127 is formed through one ohmic contact layer 115b, the semiconductor layer 114b, and the first insulating film 113. The drain electrode 117d is electrically connected to the sensor electrode 111.

A second insulating film 118 is formed to cover the resultant structure. A phosphor layer (not shown) which converts X-rays into visible light is formed on the second insulating film 118.

The source electrode 117s is connected to a signal line 119. The control electrode 112 is connected to a gate line 120. The signal line 119 corresponds to the signal lines Sig1 to Sig4 in FIG. 12. The gate line 120 corresponds to gate lines Vg1 to Vg4 in FIG. 12. A pixel having the structure shown in FIG. 14 is present at least in the area R1. The pixel may be present in the areas R2 and R3.

The structure of a pixel having a monitor photoelectric conversion element will be described next. In this pixel, a control electrode 121 of a monitor photoelectric conversion element 102 is formed on the insulating substrate 110 in addition to the sensor electrode 111 of the image sensing photoelectric conversion element 101 and the control electrode (gate electrode) 112 of the switching TFT 103, as shown in FIG. 15. The electrodes are covered with the first insulating film 113. This pixel will be compared with that shown in FIGS. 14 and 17. The shapes and areas of the pixels are the same. In the pixel shown in FIG. 15, since the control electrode 121 is formed, the sensor electrode 111 and the like are smaller. The structures of the image sensing photoelectric conversion element 101 and switching TFT 103 are the same as those of the pixel shown in FIGS. 14 and 17 except that the image sensing photoelectric conversion element 101 is smaller.

In the monitor photoelectric conversion element 102, a semiconductor layer (photoelectric conversion layer) 114c is formed on the first insulating film 113 to be aligned with the control electrode 121. Ohmic contact layers (second electrodes) 115c are formed at two portions on the semiconductor layer 114c. A drain electrode 122d and a source electrode 122s are formed on the two ohmic contact layers 115c, respectively. The drain electrode 122d and source electrode 122s are covered with the second insulating film 118.

As shown in FIG. 15, the control electrode 121 is formed to be longer than the semiconductor layer 114c. A through hole 128 is formed at a position of the first insulating film 113, which is aligned to the two terminal portions of the control electrode 121. An upper interconnection 123 which electrically connects the control electrodes 121 of pixels that are adjacent to each other via the gate line 120 is formed over the gate line 120 through the through hole 128. A pixel having the structure shown in FIG. 15 is present in the area R2.

A pixel having lead interconnections for a monitor photoelectric conversion element has an interconnection 124 for the drain electrode 122d, an interconnection 125 for the control electrode 121, and an interconnection 126 for the source electrode 122s, as shown in FIG. 16. The interconnections 124 to 126 run in parallel to the common electrode bias line 116. The interconnections are laid out to be adjacent to the image sensing photoelectric conversion element 101 in the pixel along the direction in which the gate interconnection 120 runs. This pixel will be compared with that shown in FIGS. 14 and 17. The shapes and areas of the pixels are the same. In the pixel shown in FIG. 16, since the interconnections 124 to 126 are formed, the sensor electrode 111 and the like are smaller. The structures of the image sensing photoelectric conversion element 101 and switching TFT 103 are the same as those of the pixel shown in FIGS. 14 and 17 except that the image sensing photoelectric conversion element 101 is smaller. A pixel having the structure shown in FIG. 16 is present in the area R3.

Although not illustrated in FIG. 17, a phosphor layer which converts X-rays into visible light is formed on the second insulating film 118.

According to the reference example having the above arrangement, since the monitor photoelectric conversion element 102 is formed on the insulating substrate 110 independently of the image sensing photoelectric conversion element 101, any separate radiation monitor board need not be prepared, and the entire apparatus can be made compact and lightweight.

However, as shown in FIG. 15, the through hole 128 must be formed to connect the control electrode 121 and upper interconnection 123. Hence, the light-receiving area of the image sensing photoelectric conversion element 101 is not sufficiently large. In addition, as shown in FIG. 16, in the pixel having the lead interconnections 124 to 126, the light-receiving area of the image sensing photoelectric conversion element 101 is much smaller than that of the pixel shown in FIG. 14. For the arrangement of this reference example, the opening ratios of the two photoelectric conversion elements 101 and 102 must be further increased.

A radiation image sensing apparatus according to each embodiment of the present invention and a method of manufacturing the apparatus will be described below in detail with reference to the accompanying drawings.

First Embodiment

Figure 1:
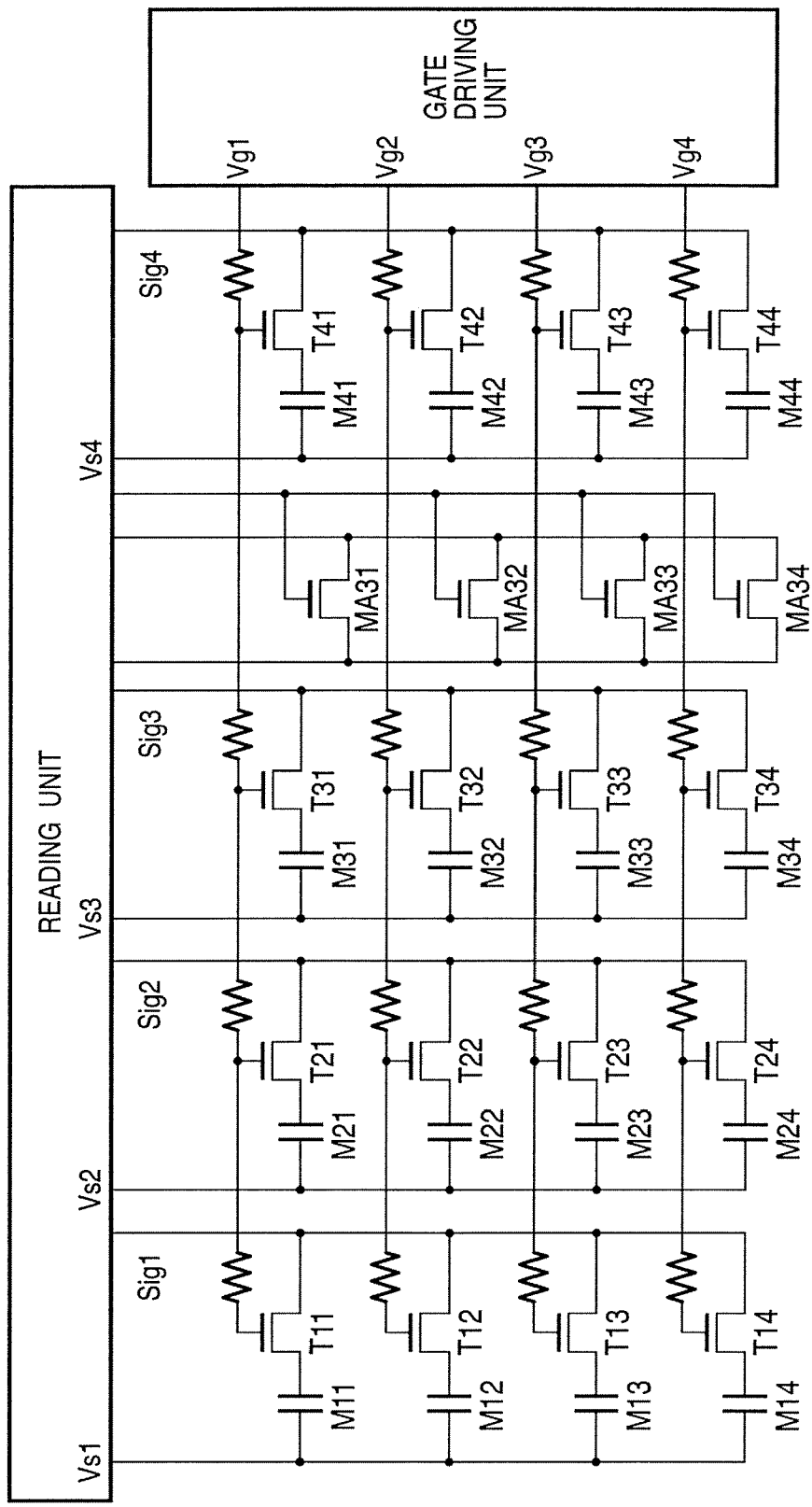
FIG. 1 is an equivalent circuit diagram showing the circuit arrangement of a radiation image sensing apparatus according to the first embodiment of the present invention.
Figure 2:
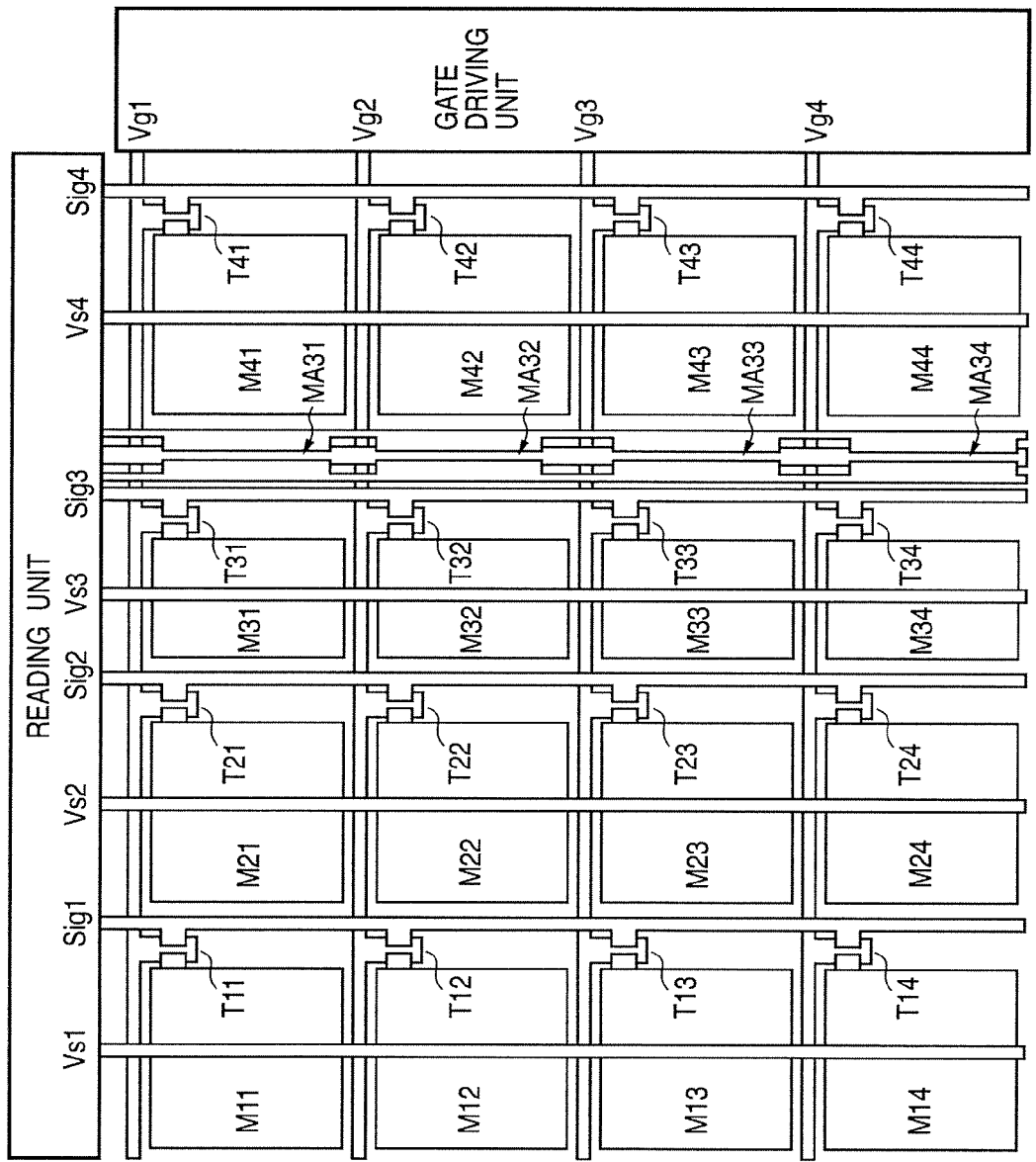
FIG. 2 is a plan view showing the layout structure of the radiation image sensing apparatus according to the first embodiment of the present invention.
Figure 3:
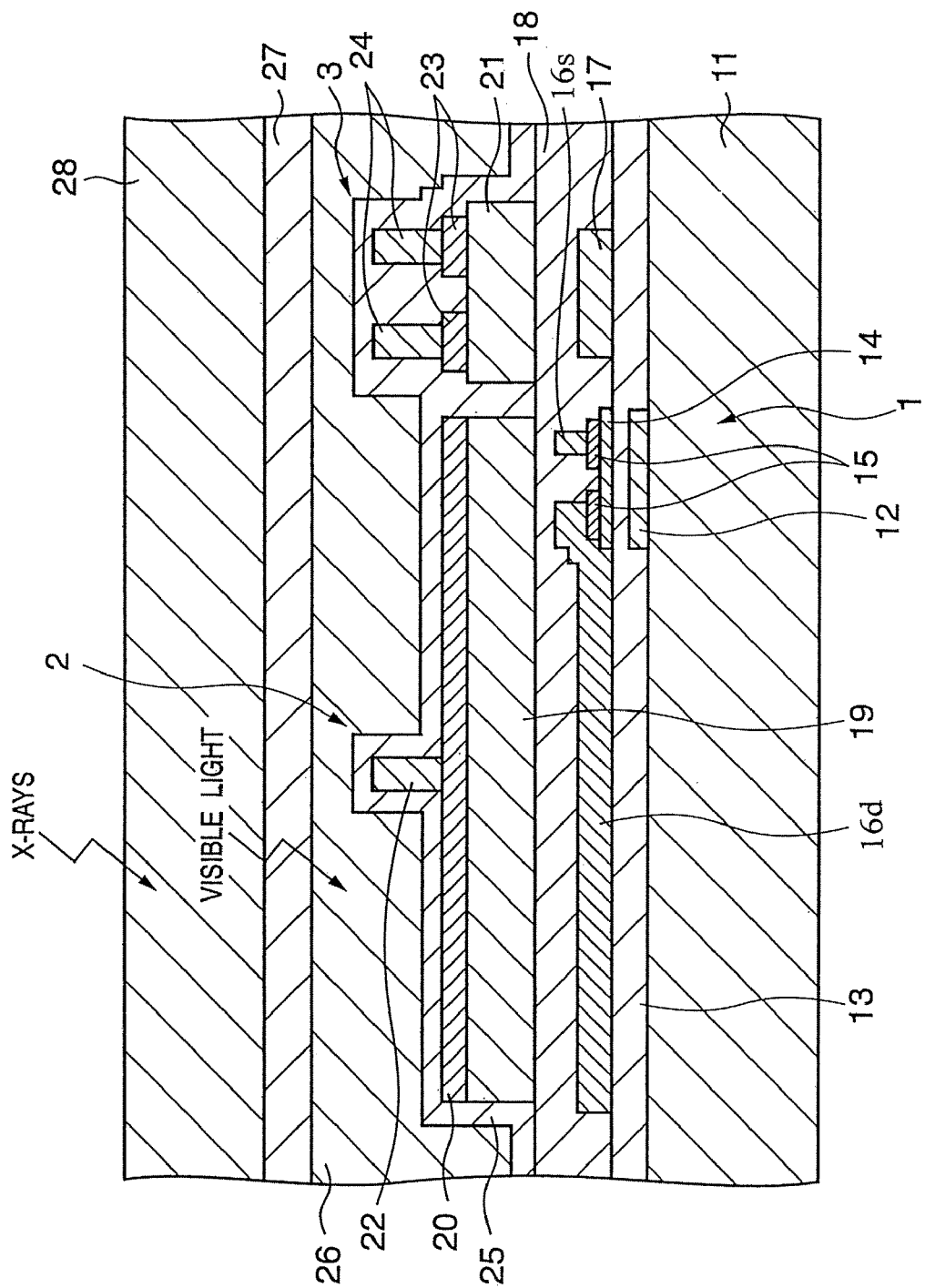
FIG. 3 is a sectional view showing the layer structure of one pixel of the radiation image sensing apparatus according to the first embodiment of the present invention.

The first embodiment of the present invention will be described first. FIG. 1 is an equivalent circuit diagram showing the circuit arrangement of a radiation image sensing apparatus according to the first embodiment of the present invention. FIG. 2 is a plan view showing the layout structure of the radiation image sensing apparatus according to the first embodiment. FIG. 3 is a sectional view showing the layer structure of one pixel of the radiation image sensing apparatus according to the first embodiment. FIGS. 1 and 2 show an example in which 4 (rows)×4 (columns) (=a total of 16) pixels are arranged in a pixel area. However, the number of pixels is not limited to this. For example, 2,000× 2,000 pixels may be arranged. Semiconductor conversion elements here include an optical conversion element which converts light into charges and a radiation conversion element which directly converts radiation into charges.

In this embodiment, a combination of a MIS photoelectric conversion element (first semiconductor conversion element) and a read thin film transistor (TFT) (switch element) or a combination of a MIS photoelectric conversion element (first semiconductor conversion element), read TFT (switch element), and TFT sensor (second semiconductor conversion element) for AEC is arranged for each pixel. More specifically, a pixel on the ath row and the bth column from the upper side in FIGS. 1 and 2 has one photoelectric conversion element Mba and one thin film transistor Tba (a, b=1, 2, 3, 4). A pixel on the ath row and the third column also has one TFT sensor MA3a.

Four MIS photoelectric conversion elements arranged on the bth column are connected to a common bias line Vsb so that a predetermined bias is applied from a reading unit. The gate electrodes of four read TFTs arranged on the ath row are connected to a common gate line Vga so that the gates are ON/OFF-controlled by a gate driving unit. The source electrodes or drain electrodes of the four read TFTs arranged on the bth column are connected to a common signal line Sigb. Signal lines Sig1 to Sig4 are connected to the reading unit.

The layer structure of the pixel having the TFT sensor will be described here with reference to FIG. 3. This pixel has a channel-etching-type read TFT 1, MIS photoelectric conversion element 2, and TFT sensor 3.

As the layer structure of this pixel, a gate electrode 12 for the read TFT 1 and a first insulating layer 13 which covers the gate electrode 12 are formed on an insulating substrate 11. The first insulating layer 13 functions as the gate insulating film of the read TFT 1.

A semiconductor layer (channel layer) 14 of the read TFT 1 is formed on the first insulating layer 13. Ohmic contact layers 15 are formed on the semiconductor layer 14. Source and drain electrodes 16 are formed on the ohmic contact layers 15, respectively. One of the source and drain electrodes 16 is formed to extend from the ohmic contact layer 15 to the first insulating layer 13. The source and drain electrodes 16 also function as the lower electrodes of the MIS photoelectric conversion element 2. A gate electrode 17 of the TFT sensor 3 is also formed on the first insulating layer 13. A second insulating layer 18 that covers the gate electrode 17 and source and drain electrodes 16 is formed. The second insulating layer 18 functions as the gate insulating film of the TFT sensor 3.

A semiconductor layer 19 and an $n^+$-semiconductor layer 20 are formed on the second insulating layer 18 to be aligned with the source and drain electrodes 16 that also function as the lower electrode of the MIS photoelectric conversion element 2 when viewed from the upper side. A semiconductor layer (channel layer) 21 of the TFT sensor 3 is also formed on the second insulating layer 18. The semiconductor layers 19 and 21 are formed from the same layer, as will be described later. An upper electrode 22 of the MIS photoelectric conversion element 2 is formed on the $n^+$-semiconductor layer 20. The $n^+$-semiconductor layer 20 functions as an upper electrode. Ohmic contact layers ($n^+$-semiconductor layers) 23 are formed on the semiconductor layer 21. Source and drain electrodes 24 are formed on the ohmic contact layers 23, respectively. A third insulating layer 25 that covers the upper electrode 22 and source and drain electrodes 24 is formed.

An organic protective layer 26, adhesive layer 27, and phosphor layer 28 are sequentially formed on the third insulating layer 25.

As the read TFT 1, a TFT with a high transfer speed is preferably used. Hence, the semiconductor layer 14 is a thin film. On the other hand, the MIS photoelectric conversion element 2 and TFT sensor 3 can preferably absorb incident light sufficiently. Hence, the semiconductor layers 19 and 21 are preferably thicker than the semiconductor layer 14. The speed may be further increased by using a TFT made of polysilicon as the read TFT 1.

In the layer structure of a pixel that has no TFT sensor 3, the gate electrode 17, semiconductor layer 21, ohmic contact layers 23, and source and drain electrodes 24 are omitted from the structure shown in FIG. 3.

The upper electrode 22 of the MIS photoelectric conversion element 2 is connected to a bias line. One of the source and drain electrodes 16, which is not used as the lower electrode, is connected to a signal line. The gate electrode 12 is connected to a gate line. In the TFT sensor 3, the gate electrode 17 and source and drain electrodes 24 are connected to a reading unit.

The operation of the radiation image sensing apparatus according to the first embodiment having the above arrangement will be described next.

When an object such as a human body to be inspected is exposed to X-rays on this radiation image sensing apparatus, the X-rays pass through the object to be inspected while being attenuated by it. The X-rays are converted into visible light by the phosphor layer 28. The visible light strikes the MIS photoelectric conversion element 2 and is converted into charges. The charges are transferred to the signal line through the read TFT 1 in accordance with a gate driving pulse applied from a gate driving unit and output to the outside through the reading unit. After that, charges that are generated by the MIS photoelectric conversion element 2 and remain there without being transferred are removed through the common bias line.

For the TFT sensor 3, for example, a predetermined bias that depletes the semiconductor layer 21 is applied between the source and drain electrodes 24 in advance. When a predetermined bias is applied in advance, charges corresponding to incident light are always output. When the output value is amplified by an amplifier (AMP) and added, the total X-ray dose can be detected by the reading unit. X-ray exposure is controlled on the basis of the total X-ray dose.

According to the first embodiment, the AEC sensor is formed on the insulating substrate independently of the image sensing sensor. For this reason, the total X-ray dose can be sufficiently detected without driving the image sensing sensor (MIS photoelectric conversion element 2) at a high speed. In addition, since the MIS photoelectric conversion element 2 need not be driven at a high speed, the charge storage time, charge transfer time, and capacitor reset time can be sufficiently ensured. Hence, an image with a high image quality can be sensed.

In addition, X-rays are not attenuated by the AEC sensor before incidence on the MIS photoelectric conversion element 2. Hence, a high image quality can be obtained.

The TFT sensor 3 can be selectively laid out at a necessary position. That is, not all the TFT sensors 3 need be laid out on one column of pixels, unlike FIG. 1. In a pixel having the TFT sensor 3, the opening ratio of the MIS photoelectric conversion element 2 decreases. However, the decrease in area can easily be compensated by image correction after the read.

A method of manufacturing the radiation image sensing apparatus according to the first embodiment will be described next.

First, a first electrode layer is formed on the insulating substrate 11 and patterned to form the gate electrode 12. Next, the first insulating layer 13 is formed on the entire surface.

A first semiconductor layer is formed on the first insulating layer 13 and patterned to form the semiconductor layer 14. The ohmic contact layers 15 are formed on the semiconductor layer 14. Subsequently, a second electrode layer is formed on the entire surface and patterned to form the source and drain electrodes 16 and gate electrode 17. The second insulating layer 18 is formed on the entire surface.

A second semiconductor layer is formed on the entire surface and patterned to form the semiconductor layers 19 and 21 simultaneously. After that, the $n^+$-semiconductor layer 20 is formed on the semiconductor layer 19, and the ohmic contact layers 23 are formed on the semiconductor layer 21. A third electrode layer is formed on the entire surface and patterned to form the upper electrode 22 and source and drain electrodes 24. The third insulating layer 25 is formed on the entire surface.

After that, the organic protective layer 26, adhesive layer 27, and phosphor layer 28 are sequentially formed on the entire surface. In the present invention, when a transparent electrode layer made of ITO (Indium Tin Oxide) or the like is formed between the third insulating layer 25 and the $n^+$-semiconductor layer 20 or ohmic contact layers 23, the $n^+$-semiconductor layer 20 can be made thin. Accordingly, the incident light amount itself can be increased. Even in the TFT sensor 3, when a transparent electrode layer is used for the source and drain electrodes 24, the incident light amount can be increased. Hence, the sensitivity of the TFT sensor increases.

In this way, the radiation image sensing apparatus according to the first embodiment can be manufactured.

Second Embodiment

Figure 4:
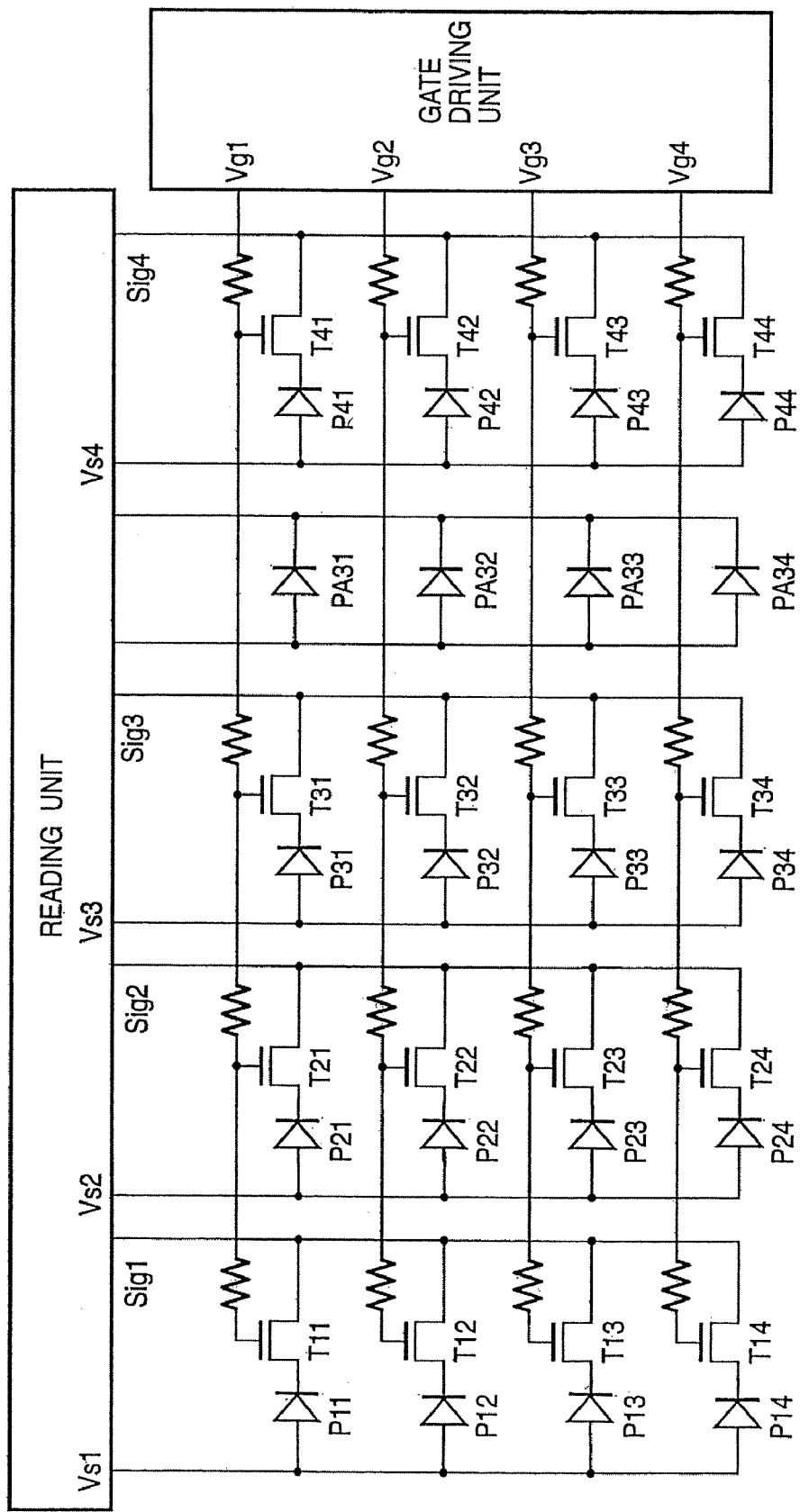
FIG. 4 is an equivalent circuit diagram showing the circuit arrangement of a radiation image sensing apparatus according to the second embodiment of the present invention.
Figure 5:
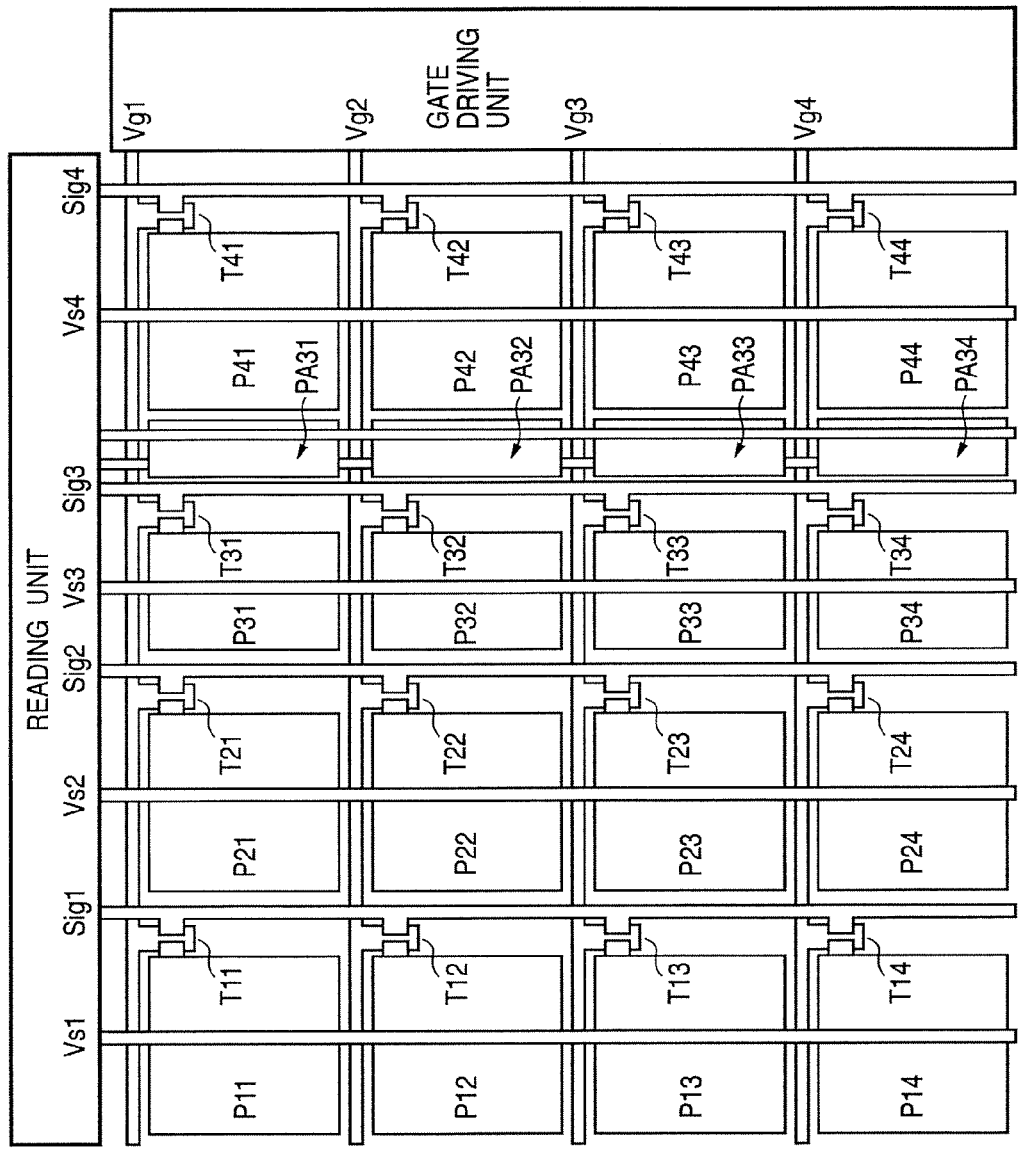
FIG. 5 is a plan view showing the layout structure of the radiation image sensing apparatus according to the second embodiment of the present invention.
Figure 6:
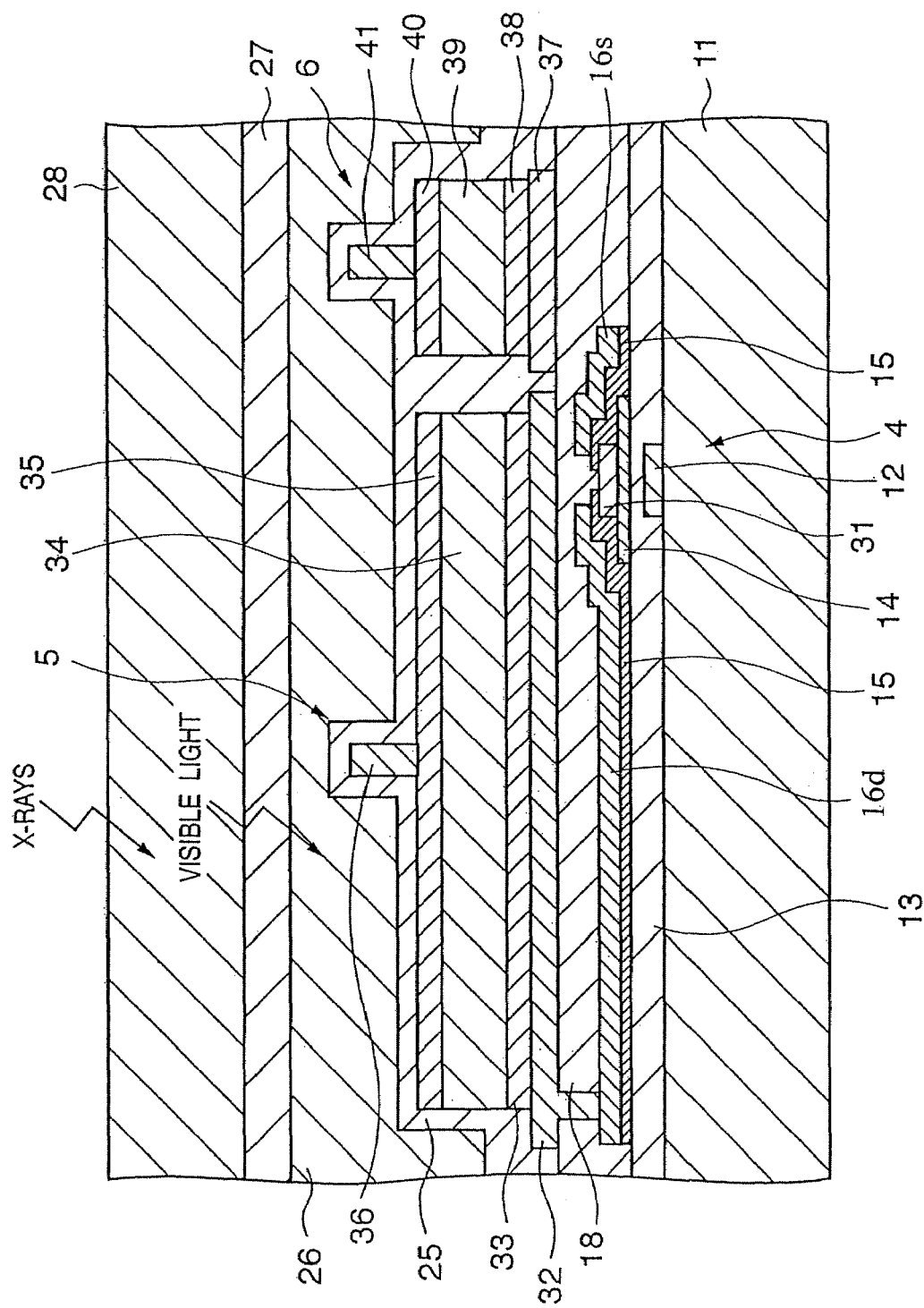
FIG. 6 is a sectional view showing the layer structure of one pixel of the radiation image sensing apparatus according to the second embodiment of the present invention.

The second embodiment of the present invention will be described next. FIG. 4 is an equivalent circuit diagram showing the circuit arrangement of a radiation image sensing apparatus according to the second embodiment of the present invention. FIG. 5 is a plan view showing the layout structure of the radiation image sensing apparatus according to the second embodiment. FIG. 6 is a sectional view showing the layer structure of one pixel of the radiation image sensing apparatus according to the second embodiment. FIGS. 4 and 5 show an example in which 4 (rows)×4 (columns) (=a total of 16) pixels are arranged in a pixel area, as in the first embodiment. However, the number of pixels is not limited to this. For example, 2,000×2,000 pixels may be arranged.

In this embodiment, a combination of a PIN photoelectric conversion element (first semiconductor conversion element) and a read TFT (switch element) or a combination of a PIN photoelectric conversion element (first semiconductor conversion element), read TFT (switch element), and PIN sensor (second semiconductor conversion element) for AEC is arranged for each pixel. More specifically, a pixel on the ath row and the bth column from the upper side in FIGS. 4 and 5 has one photoelectric conversion element Pba and one thin film transistor Tba (a, b=1, 2, 3, 4). A pixel on the ath row and the third column also has one PIN sensor PA3$a$.

Four PIN photoelectric conversion elements arranged on the bth column are connected to a common bias line Vsb so that a predetermined bias is applied from a reading unit. The gate electrodes of four read TFTs arranged on the ath row are connected to a common gate line Vga so that the gates are ON/OFF-controlled by a gate driving unit. The source electrodes or drain electrodes of the four read TFTs arranged on the bth column are connected to a common signal line Sigb. Signal lines Sig1 to Sig4 are connected to the reading unit.

The layer structure of the pixel having the PIN sensor will be described here with reference to FIG. 6. This pixel has an etching-stopper-type read TFT 4, PIN photoelectric conversion element 5, and PIN sensor 6.

As the layer structure of this pixel, a gate electrode 12 for the read TFT 4 and a first insulating layer 13 which covers the gate electrode 12 are formed on an insulating substrate 11. The first insulating layer 13 functions as the gate insulating film of the read TFT 4.

A semiconductor layer (channel layer) 14 of the read TFT 4 is formed on the first insulating layer 13. A fourth insulating layer 31 is formed on the semiconductor layer 14. Ohmic contact layers 15 that sandwich the fourth insulating layer 31 are formed. One of the ohmic contact layers 15 is formed to extend from the fourth insulating layer 31 and semiconductor layer 14 to the first insulating layer 13. Source and drain electrodes 16 are formed on the ohmic contact layers 15, respectively. A second insulating layer 18 that covers the source and drain electrodes 16 is formed.

A contact hole is formed in the second insulating layer 18 and reaches one of the source and drain electrodes 16, which extends on the first insulating layer 13. A lower electrode 32 of the PIN photoelectric conversion element 5 is formed on the second insulating layer 18 and connected to one of the source and drain electrodes 16 through the contact hole. An n-semiconductor layer 33, intrinsic semiconductor layer 34, and p-semiconductor layer 35 are sequentially formed on the lower electrode 32. An upper electrode 36 of the PIN photoelectric conversion element 5 is formed on the p-semiconductor layer 35.

A lower electrode 37 of the PIN sensor 6 is also formed on the second insulating layer 18. An n-semiconductor layer 38, intrinsic semiconductor layer 39, and p-semiconductor layer 40 are sequentially formed on the lower electrode 37. As will be described later, the n-semiconductor layers 33 and 38 are formed from the same layer. The intrinsic semiconductor layers 34 and 39 are formed from the same layer. The p-semiconductor layers 35 and 40 are formed from the same layer. An upper electrode 41 of the PIN sensor 6 is formed on the p-semiconductor layer 40. A third insulating layer 25 that covers the upper electrodes 36 and 41 is formed.

An organic protective layer 26, adhesive layer 27, and phosphor layer 28 are sequentially formed on the third insulating layer 25, as in the first embodiment.

As the read TFT 4, a TFT with a high transfer speed is preferably used. Hence, the semiconductor layer 14 is a thin film. On the other hand, the PIN photoelectric conversion element 5 and PIN sensor 6 can preferably absorb incident light sufficiently. Hence, the intrinsic semiconductor layers 34 and 39 are preferably thicker than the semiconductor layer 14. A TFT made of polysilicon may be used.

In the layer structure of a pixel that has no PIN sensor 6, the lower electrode 37, n-semiconductor layer 38, intrinsic semiconductor layer 39, p-semiconductor layer 40, and upper electrode 41 are omitted from the structure shown in FIG. 6.

The upper electrode 36 of the PIN photoelectric conversion element 5 is connected to a bias line. One of the source and drain electrodes 16, which is not connected to the lower electrode 32, is connected to a signal line. The gate electrode 12 is connected to a gate line. In the PIN sensor 6, the lower electrode 37 and upper electrode 41 are connected to a reading unit.

The operation of the radiation image sensing apparatus according to the second embodiment having the above arrangement will be described next.

When an object such as a human body to be inspected is exposed to X-rays on this radiation image sensing apparatus, the X-rays pass through the object to be inspected while being attenuated by it. The X-rays are converted into visible light by the phosphor layer 28. The visible light strikes the PIN photoelectric conversion element 5 and is converted into charges. The charges are transferred to the signal line through the read TFT 4 in accordance with a gate driving pulse applied from a gate driving unit and output to the outside through the reading unit.

For the PIN sensor 6, for example, a predetermined bias is applied between the lower electrode 37 and the upper electrode 41 in advance. When a predetermined bias is applied in advance, charges corresponding to incident light are always output. When the output value is amplified by an amplifier (AMP) and added, the total X-ray dose can be detected by the reading unit. X-ray exposure is controlled on the basis of the total X-ray dose.

Even in the second embodiment, the same effect as in the first embodiment can be obtained. In the second embodiment, since the lower electrode 32 of the PIN photoelectric conversion element 5 is larger than the lower electrode (one of the source and drain electrodes 16) of the MIS photoelectric conversion element 2 in the first embodiment, radiation can be detected at a higher efficiency.

The PIN sensor 6 can be selectively laid out at a necessary position. That is, not all the PIN sensor 6 need be laid out on one column of pixels, unlike FIG. 4. In a pixel having the PIN sensor 6, the opening ratio of the PIN photoelectric conversion element 5 decreases. However, the decrease in area can easily be compensated by image correction after the read.

A method of manufacturing the radiation image sensing apparatus according to the second embodiment will be described next.

First, a first electrode layer is formed on the insulating substrate 11 and patterned to form the gate electrode 12. Next, the first insulating layer 13 is formed on the entire surface.

A first semiconductor layer is formed on the first insulating layer 13 and patterned to form the semiconductor layer 14. The fourth insulating layer 31 is formed at the center of the semiconductor layer 14. Then, the ohmic contact layers 15 are formed on the semiconductor layer 14. Subsequently, a second electrode layer is formed on the entire surface and patterned to form the source and drain electrodes 16. The second insulating layer 18 is formed on the entire surface. The contact hole that reaches one of the source and drain electrodes 16 is formed in the second insulating layer 18.

A fourth electrode layer that fills the contact hole is formed and patterned to form the lower electrodes 32 and 37 simultaneously. Third to fifth semiconductor layers are formed on the entire surface and patterned to form the n-semiconductor layers 33 and 38 simultaneously, the intrinsic semiconductor layers 34 and 39 simultaneously, and the p-semiconductor layers 35 and 40 simultaneously. Subsequently, a fifth electrode layer is formed on the entire surface and patterned to form the upper electrodes 36 and 41. The third insulating layer 25 is formed on the entire surface.

After that, the organic protective layer 26, adhesive layer 27, and phosphor layer 28 are sequentially formed on the entire surface.

In this way, the radiation image sensing apparatus according to the second embodiment can be manufactured.

Instead of forming the PIN photoelectric conversion element 5 and PIN sensor 6, an insulating film may be formed on the lower electrode 33, and a MIS photoelectric conversion element and TFT sensor may be formed on the insulating film.

Third Embodiment

The third embodiment of the present invention will be described next. In this embodiment, a combination of a photoconductive element (first photoconductive element), read TFT (switch element), and image sensing capacitor (capacitive element) or a combination of a photoconductive element (first photoconductive element), read TFT (switch element), image sensing capacitor (capacitive element), and photoconductive sensor (second photoconductive element) for AEC is arranged for each pixel.

Figure 7:
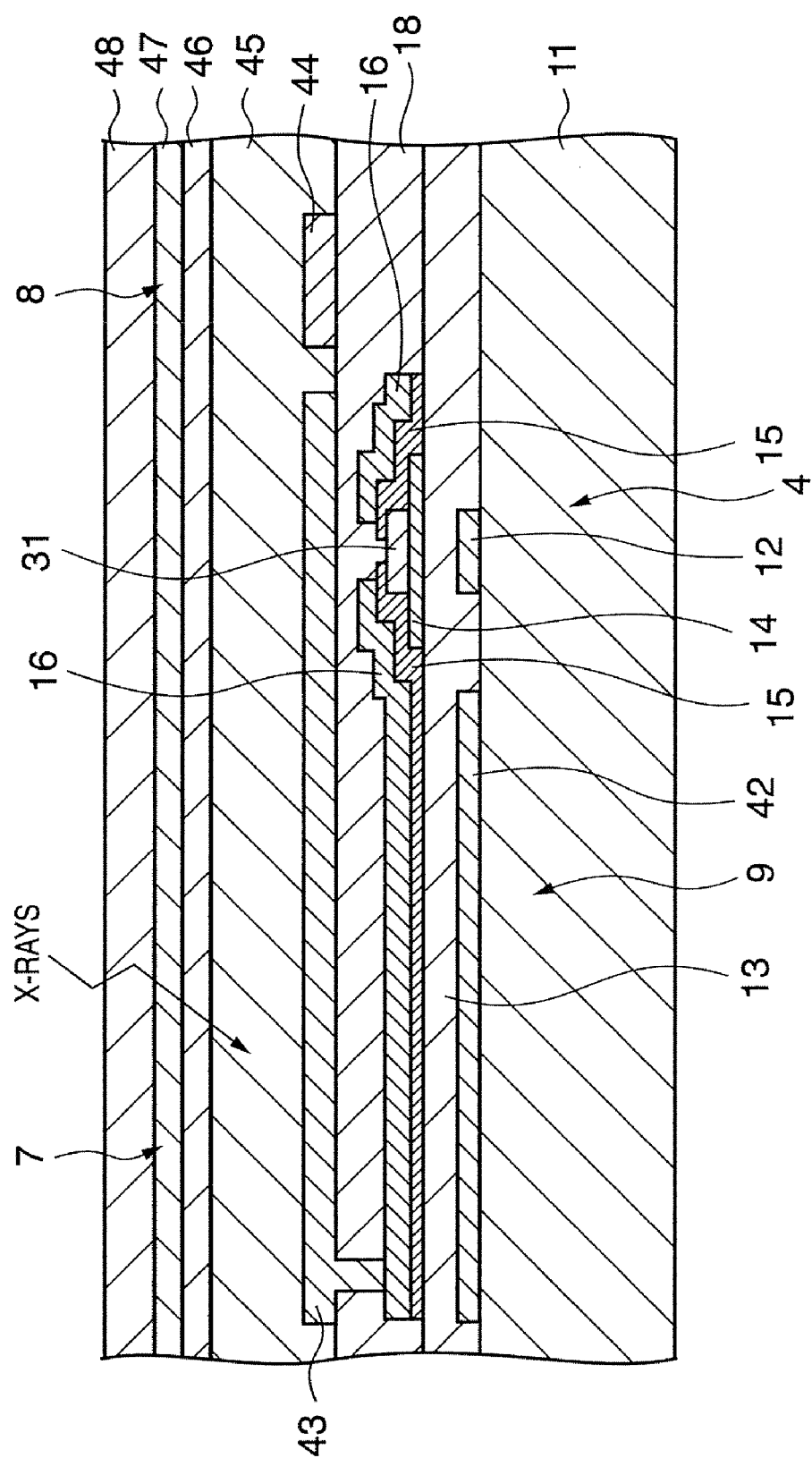
FIG. 7 is a sectional view showing the layer structure of one pixel of a radiation image sensing apparatus according to the third embodiment of the present invention.

The layer structure of a pixel having a photoconductive sensor will be described here with reference to FIG. 7. FIG. 7 is a sectional view showing the layer structure of one pixel of a radiation image sensing apparatus according to the third embodiment of the present invention. This pixel has an etching-stopper-type read TFT 4, photoconductive element 7, photoconductive sensor 8, and image sensing capacitor 9. The structure of the read TFT 4 is the same as in the second embodiment.

As the layer structure of this pixel, a gate electrode 12 for the read TFT 4, a lower electrode 42 of the image sensing capacitor 9, and a first insulating layer 13 which covers the electrodes 12 and 42 are formed on an insulating substrate 11. The first insulating layer 13 functions as the gate insulating film of the read TFT 4.

A semiconductor layer (channel layer) 14 of the read TFT 4 is formed on the first insulating layer 13 to be aligned with the gate electrode 12 when viewed from the upper side. A fourth insulating layer 31 is formed on the semiconductor layer 14. Ohmic contact layers 15 that sandwich the fourth insulating layer 31 are formed. One of the ohmic contact layers 15 is formed to extend from the fourth insulating layer 31 and semiconductor layer 14 to the first insulating layer 13 and be aligned with the lower electrode 42 when viewed from the upper side. Source and drain electrodes 16 are formed on the ohmic contact layers 15, respectively. A second insulating layer 18 that covers the source and drain electrodes 16 is formed. The second insulating layer 18 is made of, e.g., BCB (benzocyclobutene).

A contact hole is formed in the second insulating layer 18 and reaches one of the source and drain electrodes 16, which extends on the first insulating layer 13. A lower electrode (charge collection electrode) 43 of the photoconductive element 7 is formed on the second insulating layer 18 and connected to one of the source and drain electrodes 16 through the contact hole. A lower electrode (charge collection electrode) 44 of the photoconductive sensor 8 is also formed on the second insulating layer 18. An amorphous selenium layer 45 that covers the lower electrodes 43 and 44 is formed. The amorphous selenium layer 45 is shared by the photoconductive element 7 and photoconductive sensor 8.

An upper electrode (common electrode) 46, fifth insulating layer 47, and organic protective layer 48, which are shared by the photoconductive element 7 and photoconductive sensor 8, are formed on the amorphous selenium layer 45. The lower electrode 44 and upper electrode 46 may be made of, e.g., a p- or n-semiconductor.

In the layer structure of a pixel that has no photoconductive sensor 8, the lower electrode 44 is omitted from the structure shown in FIG. 7.

The upper electrode 46 is shared by pixels and connected to a bias line. One of the source and drain electrodes 16, which is not connected to the lower electrode 43, is connected to a signal line. The gate electrode 12 is connected to a gate line. In the photoconductive sensor 8, the lower electrode 44 is connected to a reading unit.

The operation of the radiation image sensing apparatus according to the third embodiment having the above arrangement will be described next.

When an object such as a human body to be inspected is exposed to X-rays on this radiation image sensing apparatus, the X-rays pass through the object to be inspected while being attenuated by it. The X-rays become incident on the amorphous selenium layer 45. In the amorphous selenium layer 45, positive charges and negative charges in an amount corresponding to the energy of the incident X-rays are generated by an internal photoelectric effect (photoconductive effect). In this embodiment, a voltage of several kV is applied between the upper electrode 46 and the lower electrode 43 in advance. In such a voltage applied state, charges are generated in the amorphous selenium layer 45 by the photoconductive effect, as described above. Since the charges move along the electric field, a photocurrent is generated. When the photocurrent is generated, charges are stored in the image sensing capacitor 9. The charges are transferred to the signal line through the read TFT 4 in accordance with a gate driving pulse applied from a gate driving unit and output to the outside through the reading unit.

For the photoconductive sensor 8, for example, a predetermined bias is applied between the upper electrode 46 and the lower electrode 44 in advance. When a predetermined bias is applied in advance, charges corresponding to the energy of incident X-rays are always output. When the output value is amplified by an amplifier (AMP) and added, the total X-ray dose can be detected by the reading unit. X-ray exposure is controlled on the basis of the total X-ray dose.

Even in the third embodiment, the same effect as in the first and second embodiments can be obtained.

The photoconductive sensor 8 can be selectively laid out at a necessary position. In a pixel having the photoconductive sensor 8, the opening ratio of the photoconductive element 7 decreases. However, the decrease in area can easily be compensated by image correction after the read.

In this embodiment, the ohmic contact layers 15 or organic protective layer 48 may be omitted.

A method of manufacturing the radiation image sensing apparatus according to the third embodiment will be described next.

First, a first electrode layer is formed on the insulating substrate 11 and patterned to form the gate electrode 12 and lower electrode 42. Next, the first insulating layer 13 is formed on the entire surface.

A first semiconductor layer is formed on the first insulating layer 13 and patterned to form the semiconductor layer 14. The fourth insulating layer 31 is formed at the center of the semiconductor layer 14. Then, the ohmic contact layers 15 are formed on the semiconductor layer 14. Subsequently, a second electrode layer is formed on the entire surface and patterned to form the source and drain electrodes 16. The second insulating layer 18 made of, e.g., BCB is formed on the entire surface. The contact hole that reaches one of the source and drain electrodes 16 is formed in the second insulating layer 18. The second insulating layer 18 is planarized.

A sixth electrode layer that fills the contact hole is formed and patterned to form the lower electrodes 43 and 44. The amorphous selenium layer 45 is formed on the entire surface. The upper electrode 46 serving as a seventh electrode layer is formed on the entire surface.

The fifth insulating layer 47 and organic protective layer 48 are sequentially formed on the entire surface.

In this way, the radiation image sensing apparatus according to the third embodiment can be manufactured.

Fourth Embodiment

The fourth embodiment of the present invention will be described next. In this embodiment, a combination of a photoconductive element (first photoconductive element), read TFT (switch element), and image sensing capacitor (capacitive element) or a combination of a photoconductive element (first photoconductive element), read TFT (switch element), image sensing capacitor (capacitive element), photoconductive sensor (second photoconductive element), and AEC capacitor is arranged for each pixel.

Figure 8:
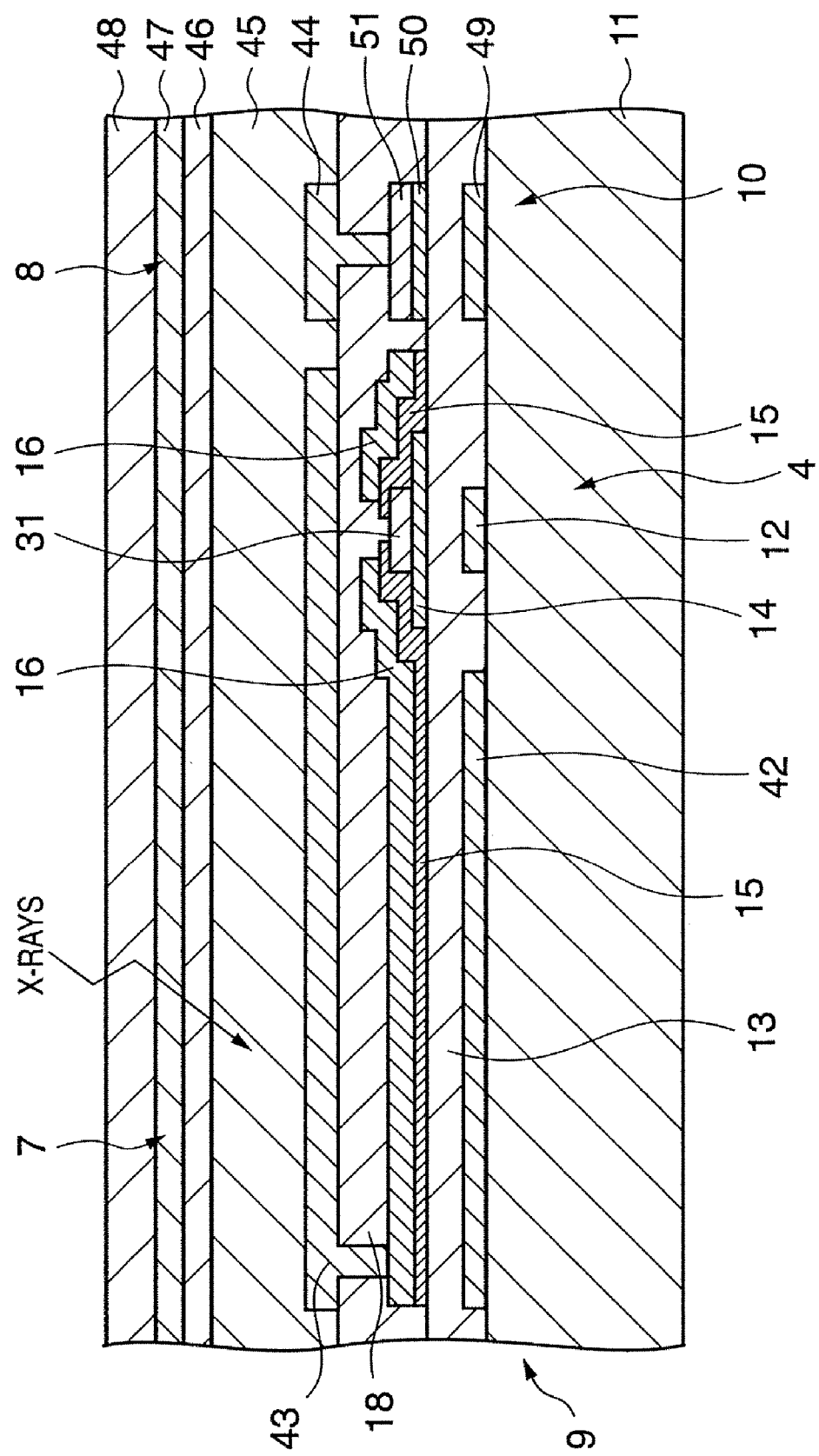
FIG. 8 is a sectional view showing the layer structure of one pixel of the radiation image sensing apparatus according to the fourth embodiment of the present invention.
Figure 9:
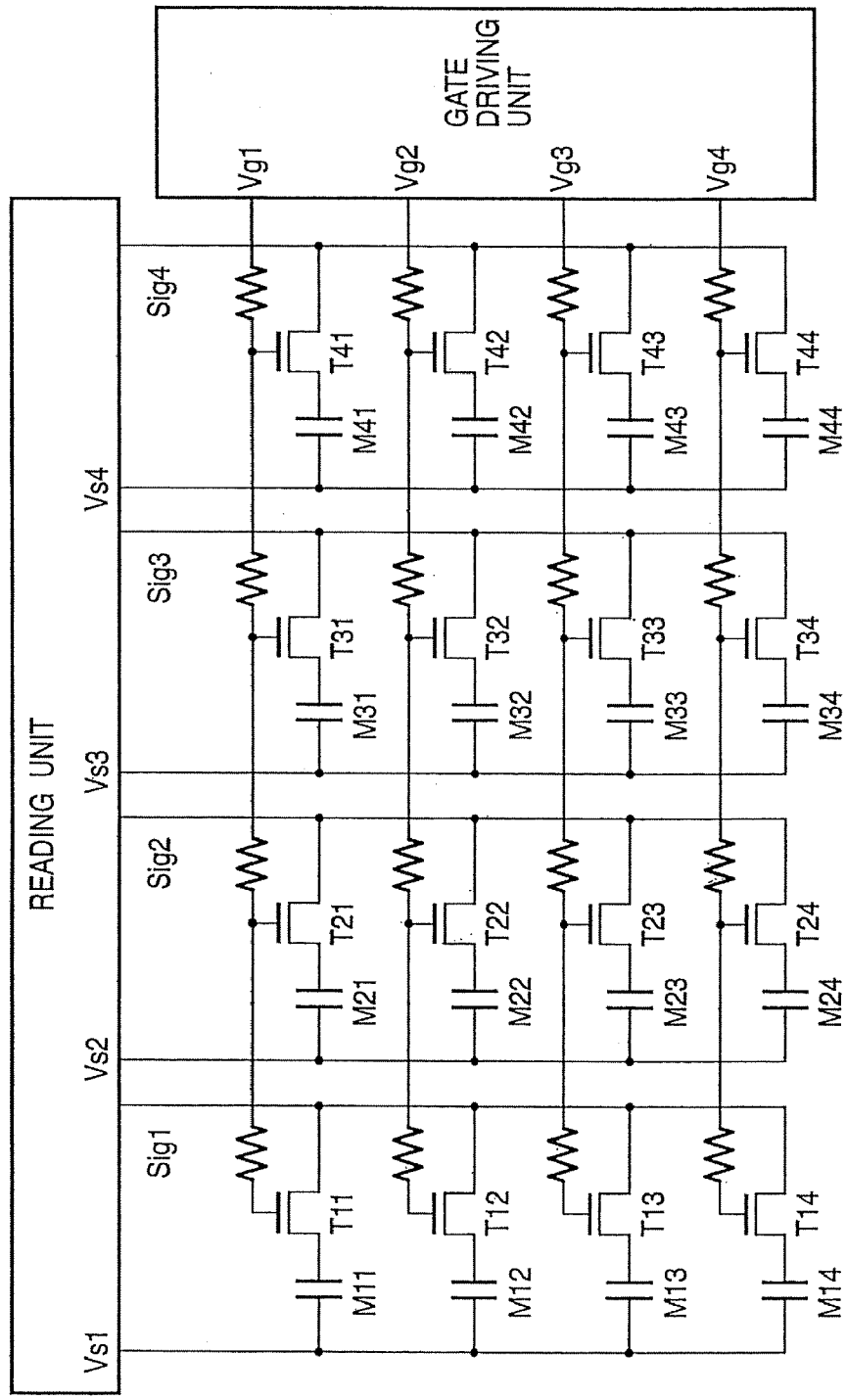
FIG. 9 is an equivalent circuit diagram showing the circuit arrangement of a conventional radiation image sensing apparatus.
Figure 10:
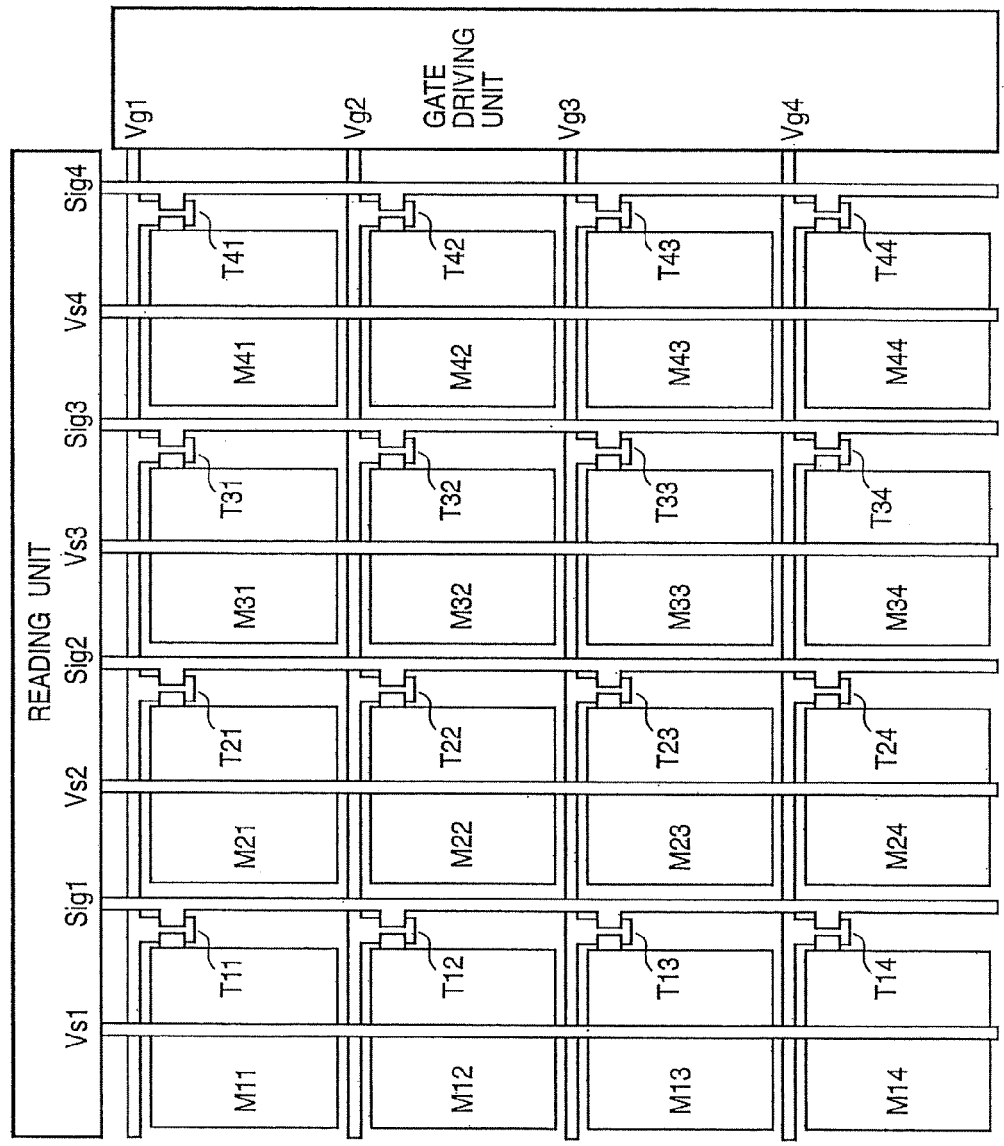
FIG. 10 is a plan view showing the layout structure of the conventional radiation image sensing apparatus shown in FIG. 9.
Figure 11:
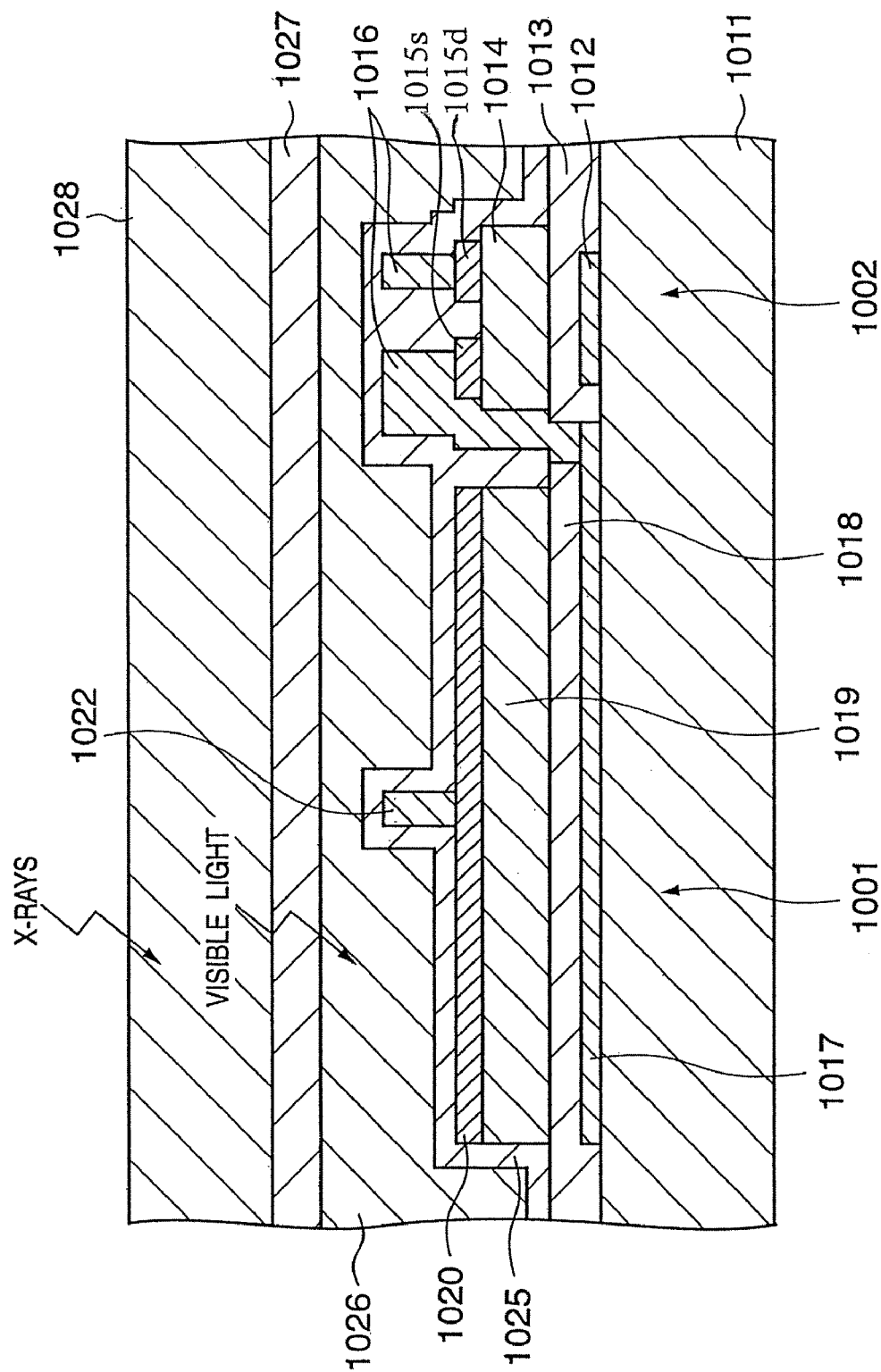
FIG. 11 is a sectional view showing the layer structure of one pixel of a photosensor having a conventional MIS-TFT structure.

The layer structure of a pixel having a photoconductive sensor will be described here with reference to FIG. 8. FIG. 8 is a sectional view showing the layer structure of one pixel of a radiation image sensing apparatus according to the fourth embodiment of the present invention. This pixel has an etching-stopper-type read TFT 4, photoconductive element 7, photoconductive sensor 8, image sensing capacitor 9, and AEC capacitor 10. The structures of the read TFT 4, photoconductive element 7, photoconductive sensor 8, and image sensing capacitor 9 are the same as in the third embodiment, and a description thereof will be omitted.

The AEC capacitor 10 has a lower electrode 49 formed on an insulating substrate 11, and a conductive layer 50 and upper electrode 51, which are sequentially formed on a first insulating layer 13. A contact hole that reaches the upper electrode 51 is formed in the second insulating layer 18. A lower electrode 44 is connected to the upper electrode 51 through the contact hole.

In this embodiment, for the photoconductive sensor 8 and AEC capacitor 10, not the lower electrode 44 but the upper electrode 51 or conductive layer 50 is connected to a reading unit, unlike the third embodiment.

The operation of the radiation image sensing apparatus according to the fourth embodiment having the above arrangement will be described next.

When an object such as a human body to be inspected is exposed to X-rays on this radiation image sensing apparatus, the X-rays pass through the object to be inspected while being attenuated by it. The X-rays become incident on an amorphous selenium layer 45. In the amorphous selenium layer 45, positive charges and negative charges in an amount corresponding to the energy of the incident X-rays are generated by an internal photoelectric effect (photoconductive effect). Even in this embodiment, a voltage of several kV is applied between an upper electrode 46 and a lower electrode 43 in advance. In such a voltage applied state, charges are generated in the amorphous selenium layer 45 by the photoconductive effect, as described above. Since the charges move along the electric field, a photocurrent is generated. When the photocurrent is generated, charges are stored in the image sensing capacitor 9. The charges are transferred to the signal line through the read TFT 4 in accordance with a gate driving pulse applied from a gate driving unit and output to the outside through the reading unit.

For the photoconductive sensor 8, for example, a predetermined bias is applied between the upper electrode 46 and the lower electrode 44 in advance. When a predetermined bias is applied in advance, charges corresponding to the energy of incident X-rays are always output through the AEC capacitor 10. When the output value is amplified by an amplifier (AMP) and added, the total X-ray dose can be detected by the reading unit. X-ray exposure is controlled on the basis of the total X-ray dose.

Even in the fourth embodiment, the same effect as in the first to third embodiments can be obtained.

The photoconductive sensor 8 and AEC capacitor 10 can be selectively laid out at necessary positions. In a pixel having the photoconductive sensor 8 and AEC capacitor 10, the opening ratio of the photoconductive element 7 decreases. However, the decrease in area can easily be compensated by image correction after the read.

In this embodiment, ohmic contact layers 15, the conductive layer 50, or an organic protective layer 48 may be omitted.

A method of manufacturing the radiation image sensing apparatus according to the fourth embodiment will be described next. The lower electrode 49 can be formed simultaneously with a gate electrode 12 and lower electrode 42 by patterning a first electrode layer. The conductive layer 50 can be formed simultaneously with the ohmic contact layers 15. The upper electrode 51 can be formed simultaneously with source and drain electrodes 16 by patterning a second electrode layer. The contact hole that reaches the upper electrode 51 can be formed simultaneously with a contact hole that reaches one of the source and drain electrodes 16. The remaining constituent elements are formed in accordance with the same procedures as in the third embodiment.

In this way, the radiation image sensing apparatus according to the fourth embodiment can be manufactured.

In the third and fourth embodiments, another layer such as a gallium arsenide layer having a photoconductive effect may be formed in place of the amorphous selenium layer 45.

According to the above-described first to fourth embodiments, AEC can be executed on the basis of a radiation dose detected through a second semiconductor conversion element or second photoconductive element. The second semiconductor conversion element or second photoconductive element is formed on the same substrate as the first semiconductor conversion element or first photoconductive element. Hence, any radiation attenuation by the second semiconductor conversion element or second photoconductive element can be prevented. The first semiconductor conversion element or first photoconductive element need not be used for AEC and therefore need not be driven at a high speed. Hence, the charge storage time, charge transfer time, and capacitor reset time can be sufficiently ensured. For this reason, according to the present invention, an image with a high image quality can be sensed.

Fifth Embodiment

Figure 18:
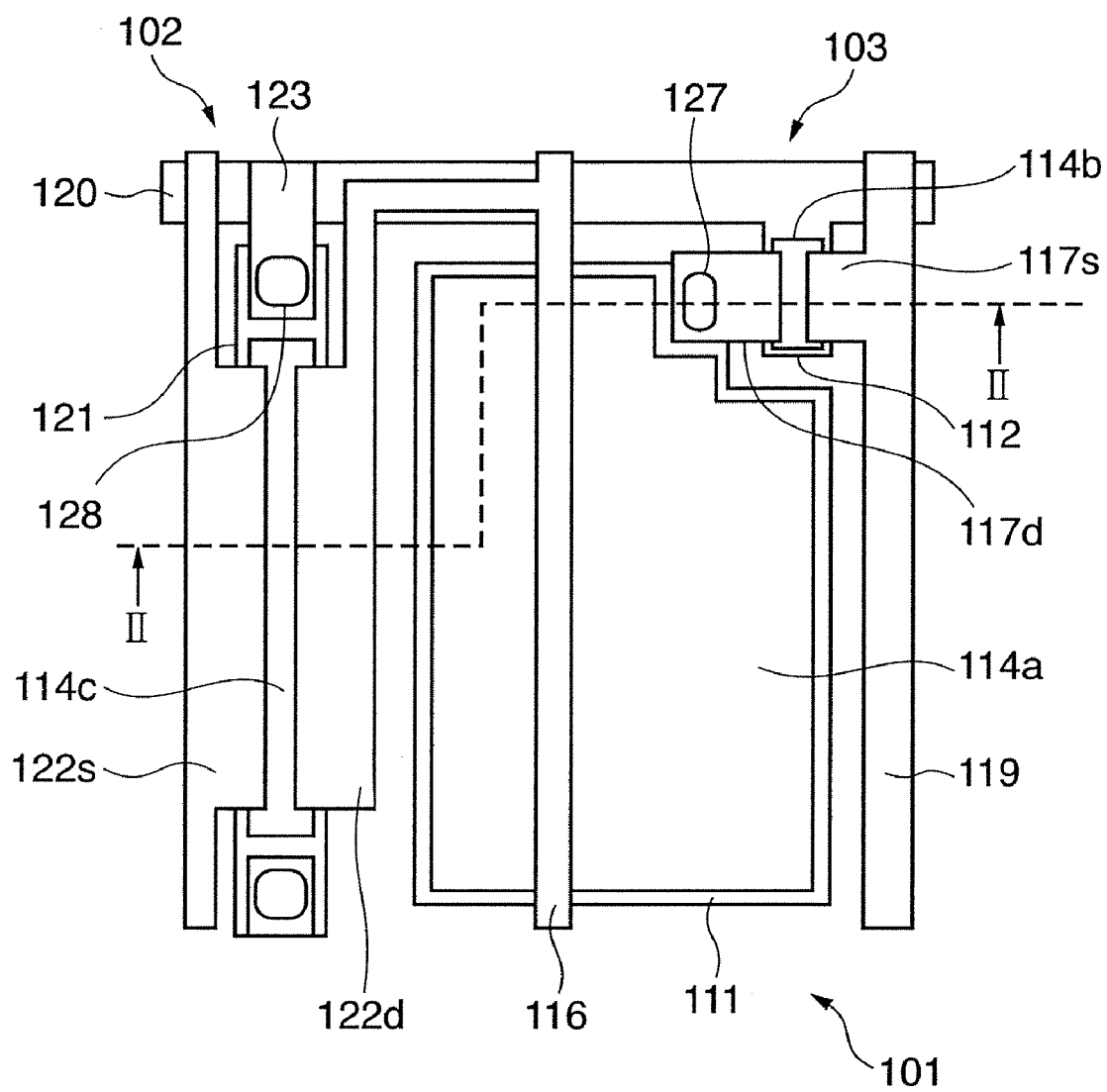
FIG. 18 is a layout diagram showing the planar structure of a pixel of a radiation image sensing apparatus according to the fifth embodiment of the present invention, which has a monitor photoelectric conversion element.
Figure 19:
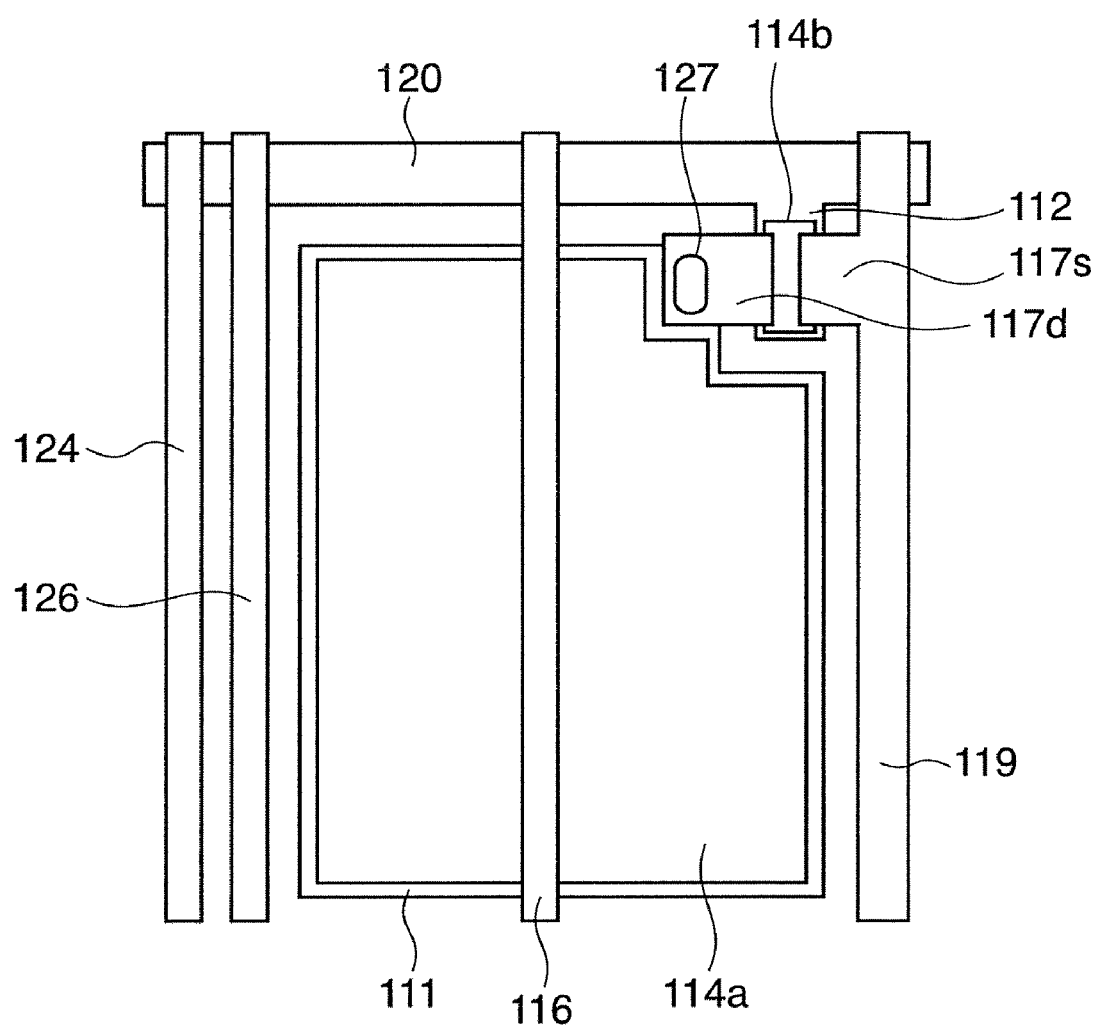
FIG. 19 is a layout diagram showing the planar structure of a pixel of the radiation image sensing apparatus according to the fifth embodiment, which has lead interconnections for a monitor photoelectric conversion element.
Figure 20:
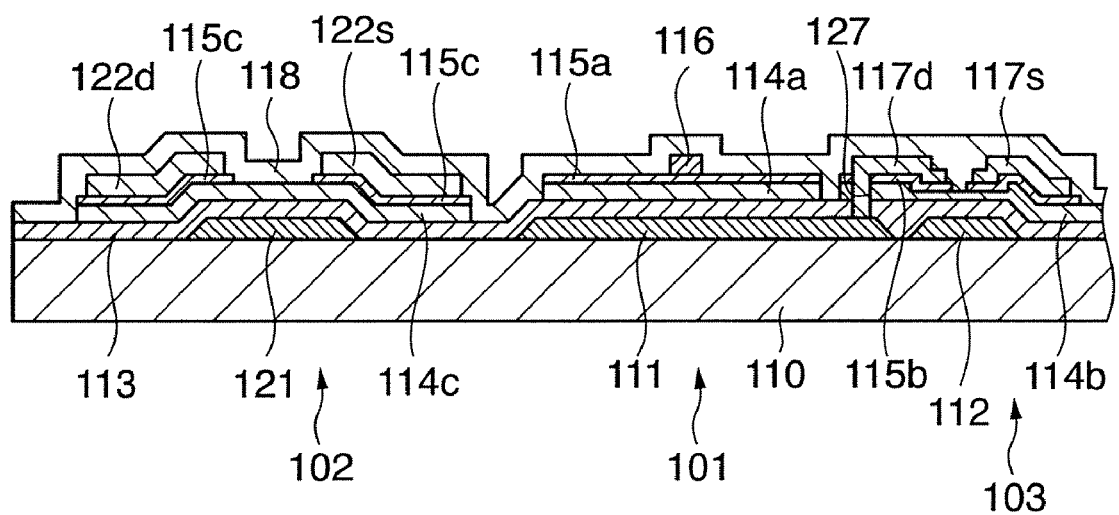
FIG. 20 is a sectional view taken along a line II-II in FIG. 18.
Figure 21:
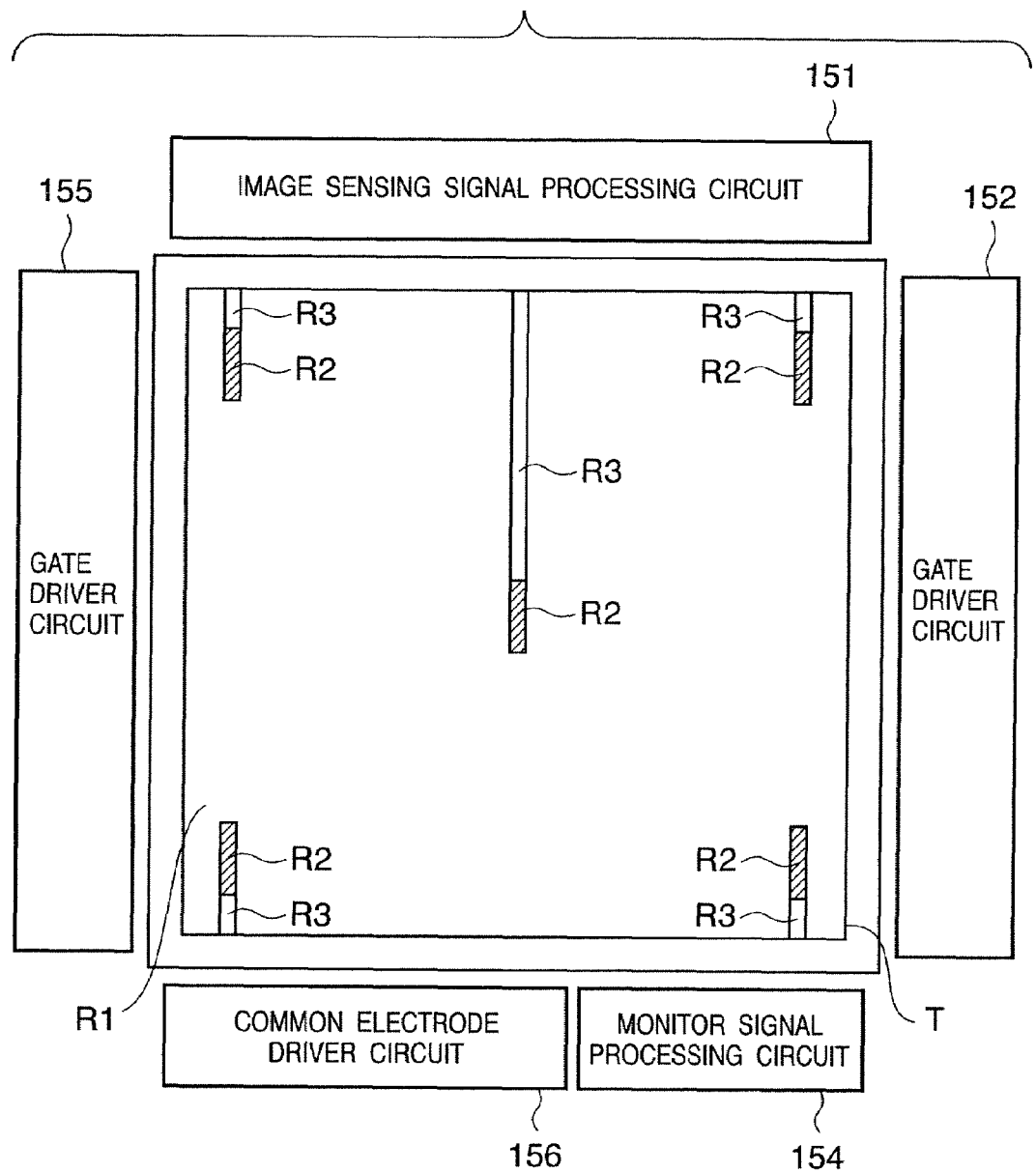
FIG. 21 is a schematic view showing the layout of a conversion section T and circuit sections around it.

The fifth embodiment of the present invention will be described next. In this embodiment, a drain electrode 222*d* is connected to a common electrode bias line 216 to omit a lead interconnection 224 of the drain electrode 222*d*. With this structure, the light-receiving area (opening ratio) of an image sensing photoelectric conversion element 1 in a pixel having a lead interconnection is increased to improve the characteristics. FIG. 18 is a layout diagram showing the planar structure of a pixel of a radiation image sensing apparatus according to this embodiment, which has a monitor photoelectric conversion element. FIG. 19 is a layout diagram showing the planar structure of a pixel of the radiation image sensing apparatus according to this embodiment, which has lead interconnections for a monitor photoelectric conversion element. FIG. 20 is a sectional view taken along a line II-II in FIG. 18. FIG. 21 is a schematic view showing the layout of a conversion section T and circuit sections around it.

In this embodiment, in a pixel having a TFT monitor photoelectric conversion element, a drain electrode 122*d* is connected to a common electrode bias line 116, as shown in FIG. 18.

Pixels each having the above structure are collectively laid out, as in the area R2 of the reference example. For example, the drain electrode 122d, a source electrode 122s, the common electrode bias line 116, and a signal line 119 are shared by these pixels.

In a pixel having lead interconnections for a monitor photoelectric conversion element, an interconnection 125 for a control electrode 121 and an interconnection 126 for the source electrode 122s are formed, as shown in FIG. 19. Unlike the reference example, no interconnection for the drain electrode 122d is formed. This is because the drain electrode 122d is connected to the common electrode bias line 116. The interconnections 125 and 126 are connected between pixels that are adjacent and are located at the outermost portion of the conversion section T. The source electrode 122s and control electrode 121 are led to the outside of the panel by the interconnections 125 and 126.

A pixel which has neither a monitor photoelectric conversion element nor lead interconnections therefor has the same structure as that of the pixel shown in FIGS. 14 and 17 (the pixel of the reference example).

The pixel shown in FIGS. 18 and 20 will be compared with that shown in FIGS. 14 and 17. The shapes and areas of the pixels are the same. In the pixel shown in FIGS. 18 and 20, since a monitor photoelectric conversion element 102 is formed, the light-receiving area (opening ratio) of an image sensing photoelectric conversion element 101 decreases. The pixel shown in FIG. 19 will be compared with that shown in FIGS. 14 and 17. The shapes and areas of the pixels are the same. Since the interconnections 125 and 126 are formed, the light-receiving area (opening ratio) of the image sensing photoelectric conversion element 101 decreases.

These pixels are laid out as shown in FIG. 13, as in the reference example. That is, areas R2 where a plurality of pixels each made of a pair of monitor photoelectric conversion element and image sensing photoelectric conversion element are formed are laid out at the four corners and near the center of the conversion section T having a two-dimensional rectangular shape. In this embodiment, monitor photoelectric conversion elements are formed in 20 (rows)×3 (columns) pixels in each area R2.

A method of driving the radiation image sensing apparatus according to this embodiment, which has the above-described arrangement, will be described next.

First, as described above, a voltage is applied from a common electrode driver circuit 156 to the common electrode bias line 116 to apply a potential between the source and the drain of the monitor photoelectric conversion element 102. In addition, the depletion voltage of a semiconductor layer 114c is applied to the control electrode 121 to prevent a dark current and increase the electron/hole collection efficiency.

In this state, the phosphor layer (not shown) is irradiated with X-rays. The photoelectric conversion section is irradiated with visible light from the phosphor layer. The visible light absorbed by the monitor photoelectric conversion element 102 is converted into charges and transported to a monitor signal processing circuit 154 through the source electrode 122s. For this reason, the charge amount can be measured in real time as an X-ray dose.

When the X-ray dose measured by the monitor signal processing circuit 154 reaches a set value, a signal is sent to the X-ray generator (radiation source) to stop X-ray irradiation. Immediately after that, the operating voltage of a TFT 103 is sequentially applied to gate lines 120 of the TFTs 103, thereby reading charges stored in the capacitors of the image sensing photoelectric conversion elements 101 from signal lines 119.

After that, a forward voltage is applied to a semiconductor layer 114a of the image sensing photoelectric conversion element 101 through the common electrode bias line 116. Accordingly, a refresh operation is performed. That is, all charges stored in the interface between an insulating film 113 and the semiconductor layer 114a in the image sensing photoelectric conversion element 101 in correspondence with the X-ray dose are removed.

A voltage with which a forward voltage is applied to the semiconductor layer 114c in accordance with the voltage applied to the common electrode bias line 116 is applied to the control electrode 121 of the monitor photoelectric conversion element 102 in advance. When this voltage is applied to the control electrode 121 in advance, a voltage for the refresh operation of the image sensing photoelectric conversion element 101 is applied to the drain electrode 122d of the monitor photoelectric conversion element 102 connected to the common electrode bias line 116. Simultaneously, the forward voltage is also applied to the semiconductor layer 114c in the monitor photoelectric conversion element 102. Hence, the refresh operation for the monitor photoelectric conversion element 102 is also executed.

In the refresh operation, not all the stored charges but some of them may be removed. A voltage that decreases a depletion bias may be applied to the common electrode bias line 116. In the refresh operation, the voltage of the source electrode 122s may be controlled to set a state to easily remove the charges.

In the reference example, three lead interconnections 124 to 126 are formed. In this embodiment, however, the lead interconnection 124 for the drain electrode is not formed. Instead, only the two lead interconnections 125 and 126 are formed. Hence, according to this embodiment, the light-receiving area (opening ratio) of the image sensing photoelectric conversion element 101 in this pixel is large. Furthermore, in the reference example, the power supply 153 to supply a voltage to the drain electrode 122d is necessary. In this embodiment, however, since the voltage is supplied from the common electrode driver circuit 156 through the common electrode bias line 116, no power supply is necessary. Hence, the circuit can be simplified.

Some pixels may have no image sensing photoelectric conversion elements 101 and only the monitor photoelectric conversion elements 102 and lead interconnections for the monitor photoelectric conversion elements 102 in adjacent pixels. In this case, data from the image sensing photoelectric conversion elements 101 decreases. The decrease must be compensated by image processing. This compensation can be done by a conventional image processing technique.

Alternatively, only the pixels of one line in each area R2, and for example, only 20 (rows)×1 (column) pixels or 1 (row)×3 (columns) pixels in the area R2 may have the monitor photoelectric conversion elements.

A method of manufacturing the radiation image sensing apparatus according to this embodiment will be described next. FIGS. 22A to 22D and 23A to 23C are sectional views showing steps in manufacturing the radiation image sensing apparatus according to this embodiment.

Figure 22A:
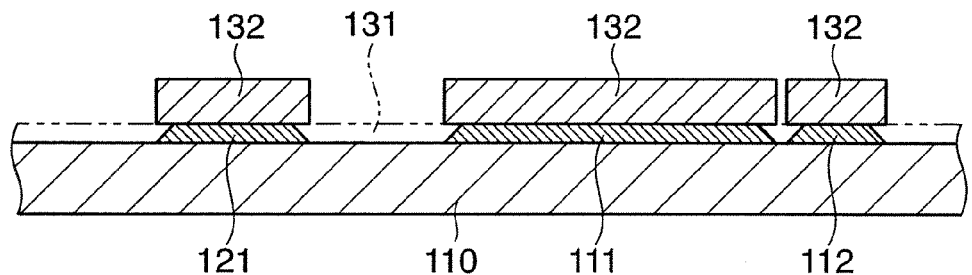
FIGS. 22A to 22D are sectional views showing steps in manufacturing the radiation image sensing apparatus according to the fifth embodiment of the present invention.

First, as shown in FIG. 22A, an AlNd film 131 serving as a first metal layer and having a thickness of 500 to 4,000 Å is formed on an insulating substrate 110 by, e.g., sputtering. An Mo film or Ta film may be formed as the first metal layer. Alternatively, a multilayered film may be formed by sequentially forming a plurality of films. Next, the AlNd film 131 is patterned by photolithography using a resist film 132 as a mask to form a sensor electrode 111, the control electrodes 112 and 121, and gate line 120. Etching of the AlNd film 131 is done by a wet process using an etchant containing, e.g., nitric acid, phosphoric acid, and acetic acid. After patterning, the resist film 132 is removed.

Figure 22B:
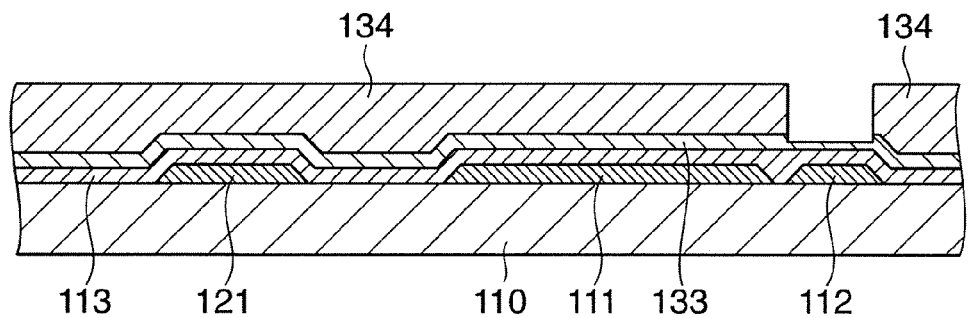

As shown in FIG. 22B, the first insulating film 113 having a thickness of 1,500 to 4,000 Å and a semiconductor layer 133 having a thickness of 2,000 to 15,000 Å are continuously formed by CVD. The semiconductor layer 133 becomes the semiconductor layer (photoelectric conversion layer) 114a of the image sensing photoelectric conversion element 101, a semiconductor layer 114b of a TFT 103, and the semiconductor layer (photoelectric conversion layer) 114c of the monitor photoelectric conversion element 102. As the first insulating film 113, for example, an SiN film is used.

Then, the semiconductor layer 133 is etched not entirely but partially by only 500 to 5,000 Å by photolithography using a resist film 134 having an opening on the control electrode 112 of the TFT 103 as a mask. The semiconductor layer 133 is formed as thick as 2,000 to 15,000 Å to increase the optical absorption efficiency in the image sensing photoelectric conversion element 101 and monitor photoelectric conversion element 102. In this state, the series resistance between the source and the drain of the TFT 103 is high. Hence, the process for thinning the semiconductor layer 133 is executed to reduce the ON resistance of the TFT 103. At this time, the semiconductor layer 133 is etched by, e.g., dry etching. As dry etching, plasma etching is preferably used because a high process accuracy can be obtained while minimizing damage to the semiconductor layer 133. Chemical dry etching which can also minimize damage to the semiconductor layer 133 may be used. Alternatively, reactive ion etching at a low power (e.g., about 0.1 to 0.2 W/cm$^2$) and high pressure (e.g., about 10 to 30 Pa) may be performed. After patterning, the resist film 134 is removed.

Figure 22C:
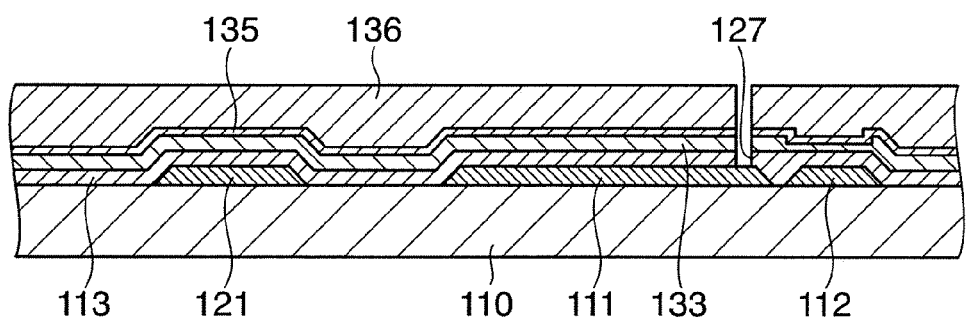

As shown in FIG. 22C, an ohmic contact layer 135 having a thickness of 100 to 1,000 Å is formed by CVD. If silicon oxide is present in the interface between the semiconductor layer 133 and the ohmic contact layer 135, a preprocess using hydrofluoric acid (e.g., about 0.1 to 10 wt %) may be executed. If an organic film is inserted, it may be removed by irradiating it with oxygen plasma. In addition, a final process using hydrogen plasma may be executed in the CVD apparatus immediately before formation of the ohmic contact layer 135.

Next, a through hole 127 is formed by photolithography using a resist film 136 as a mask. The through hole 127 electrically connects a drain electrode 117d of the TFT 103 to the sensor electrode 111 of the image sensing photoelectric conversion element 101. Charges generated when the light-receiving portion absorbs visible light are read, through the drain electrode 117d, from the sensor electrode 111 capacitively coupled to the light-receiving portion.

To improve the coverage of a metal film to be formed later, chemical dry etching is preferably performed to form a hole having a tapered section. If the coverage of the metal film need not be taken into consideration, the process accuracy may be increased by reactive ion etching. Alternatively, the hole may be formed by plasma etching. After patterning, the resist film 136 is removed.

Figure 22D:
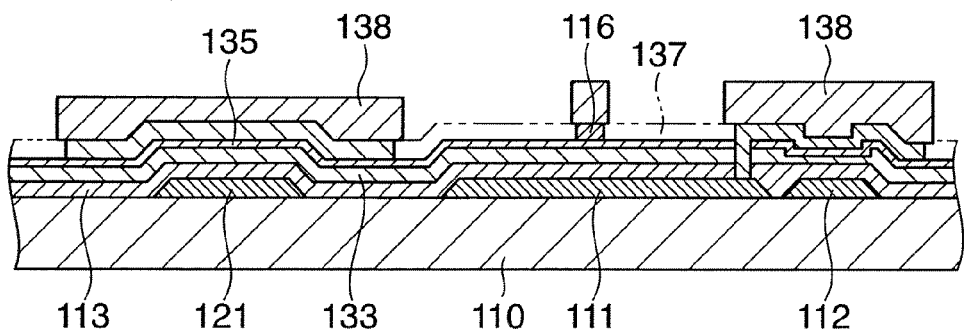

As shown in FIG. 22D, an Al film 137 serving as a second metal layer and having a thickness of 1,000 to 10,000 Å is formed by, e.g., sputtering. An Mo film or Ta film may be formed as the second metal layer. Alternatively, a multilayered film may be formed by sequentially forming a plurality of films. If an oxide film is formed on the surface of the through hole 127, and satisfactory connection to the through hole 127 cannot be ensured, a process for removing the oxide film by reverse sputtering is inserted before formation of the Al film 137.

The Al film 137 is patterned by photolithography using a resist film 138 as a mask to form the common electrode bias line 116. Etching of the Al film 137 is done by a wet process using an etchant containing, e.g., nitric acid, phosphoric acid, and acetic acid. Hence, the Al film 137 is etched slightly inward under the resist film 138. In this patterning, the Al film 137 in regions where the source electrodes 117s and 122s, drain electrodes 117d and 122d, and signal line 119 are to be formed is masked by the resist film 138 to prevent etching in this process. After patterning, the resist film 138 is removed.

Figure 23A:
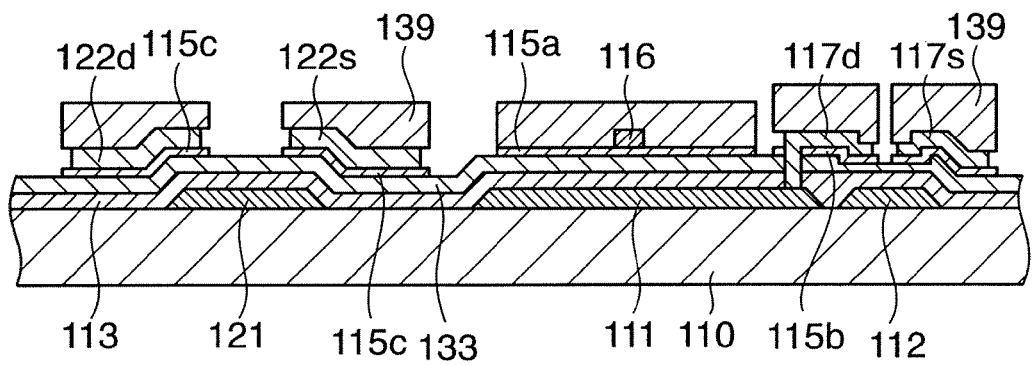
FIGS. 23A to 23C are sectional views showing steps in manufacturing the radiation image sensing apparatus according to the fifth embodiment of the present invention, which show the steps next to those shown in FIGS. 22A to 22D.

After that, as shown in FIG. 23A, the Al film 137 is patterned by photolithography using a new resist film 139 as a mask to form the source electrodes 117s and 122s, drain electrodes 117d and 122d, and signal line 119. Etching of the Al film 137 is done by a wet process using an etchant containing, e.g., nitric acid, phosphoric acid, and acetic acid. Hence, the Al film 137 is etched slightly inward under the resist film 139.

At this time, the common electrode bias line 116 that has already been formed is masked by the resist film 139 to prevent etching in this process. In addition, to prevent the ohmic contact layer 135 in the opening region of the image sensing photoelectric conversion element 101 from being removed by dry etching of the next process, not only the common electrode bias line 116 but also the entire opening region of the image sensing photoelectric conversion element 101 is masked by the resist film 139.

As shown in FIG. 23A, dry etching is performed using the resist film 139 as a mask to remove the gap portions of the TFT 103, i.e., the ohmic contact layer 135 between the sources and the drains, thereby forming ohmic contact layers 115a to 115c.

Figure 23B:
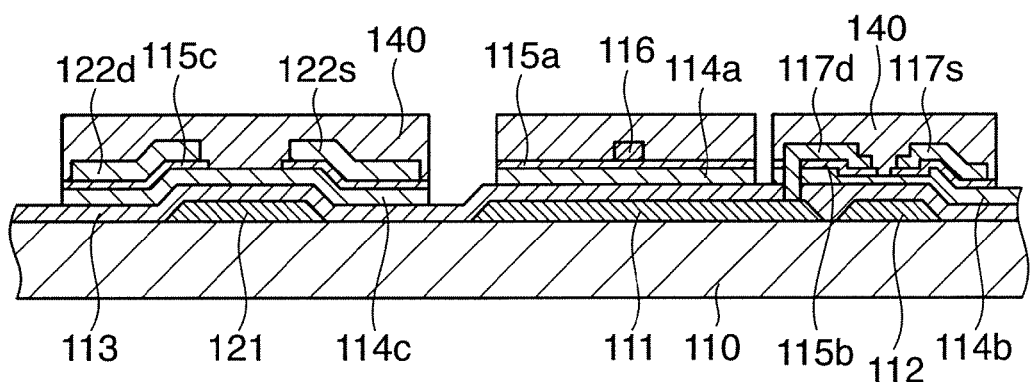

As shown in FIG. 23B, unnecessary portions of the semiconductor layer 133 and ohmic contact layer 135 are removed by photolithography using a resist film 140 as a mask to define the opening region of the image sensing photoelectric conversion element 101 and form the semiconductor layers 114a to 114c. After patterning, the resist film 140 is removed.

The unnecessary portions of the first insulating film 113 are not removed in this embodiment. However, they may be removed. When the first insulating film 113 is left without being removed, the etching process for removing the unnecessary portions of the semiconductor layer 133 and ohmic contact layer 135 is preferably executed by using plasma etching in order to ensure the process accuracy because the selectivity ratio between the semiconductor layer 133 and the SiN film that constitutes the first insulating film 113 can readily be ensured in plasma etching.

Figure 23C:
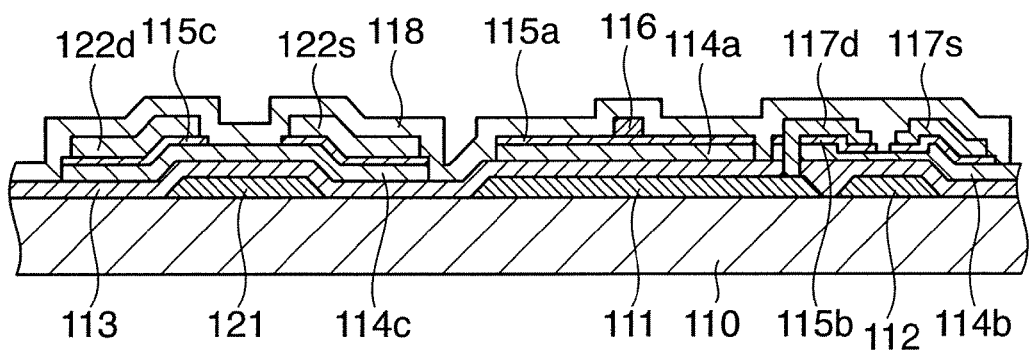

As shown in FIG. 23C, a second insulating film 118 serving as a protective film and having a thickness of 2,000 to 10,000 Å is formed by CVD. As the second insulating film 118, for example, an SiN film can be formed. In this way, the image sensing photoelectric conversion element 101, monitor photoelectric conversion element 102, and TFT 103 can be formed.

A phosphor layer (not shown) is formed. To ensure electrical connection, the protective film at the periphery is removed by patterning and dry etching using photolithography. Thus, a radiation image sensing apparatus can be completed.

In the above description of the method of manufacturing the radiation image sensing apparatus according to this embodiment, to make the ohmic contact layer function as an upper electrode (first electrode), the second metal film is formed after formation of the ohmic contact layer. When the resistivity of the ohmic contact layer is high, a transparent electrode film made of, e.g., ITO (Indium Tin Oxide) may be formed on the ohmic contact layer before formation of the second metal film. In this case, both the first and second electrodes have a multilayered structure of the ohmic contact layer and transparent electrode film. When such a transparent electrode film is formed, no problem is formed even when the ohmic contact layer is thin. Since the ohmic contact layer can be thin, the incident light amount itself can be increased. Even in the monitor photoelectric conversion element 102, when a transparent electrode film is used for the source electrode 122s and drain electrode 122d, the incident light amount can be increased. Hence, the sensitivity of the monitor photoelectric conversion element 102 increases.

Sixth Embodiment

Figure 24:
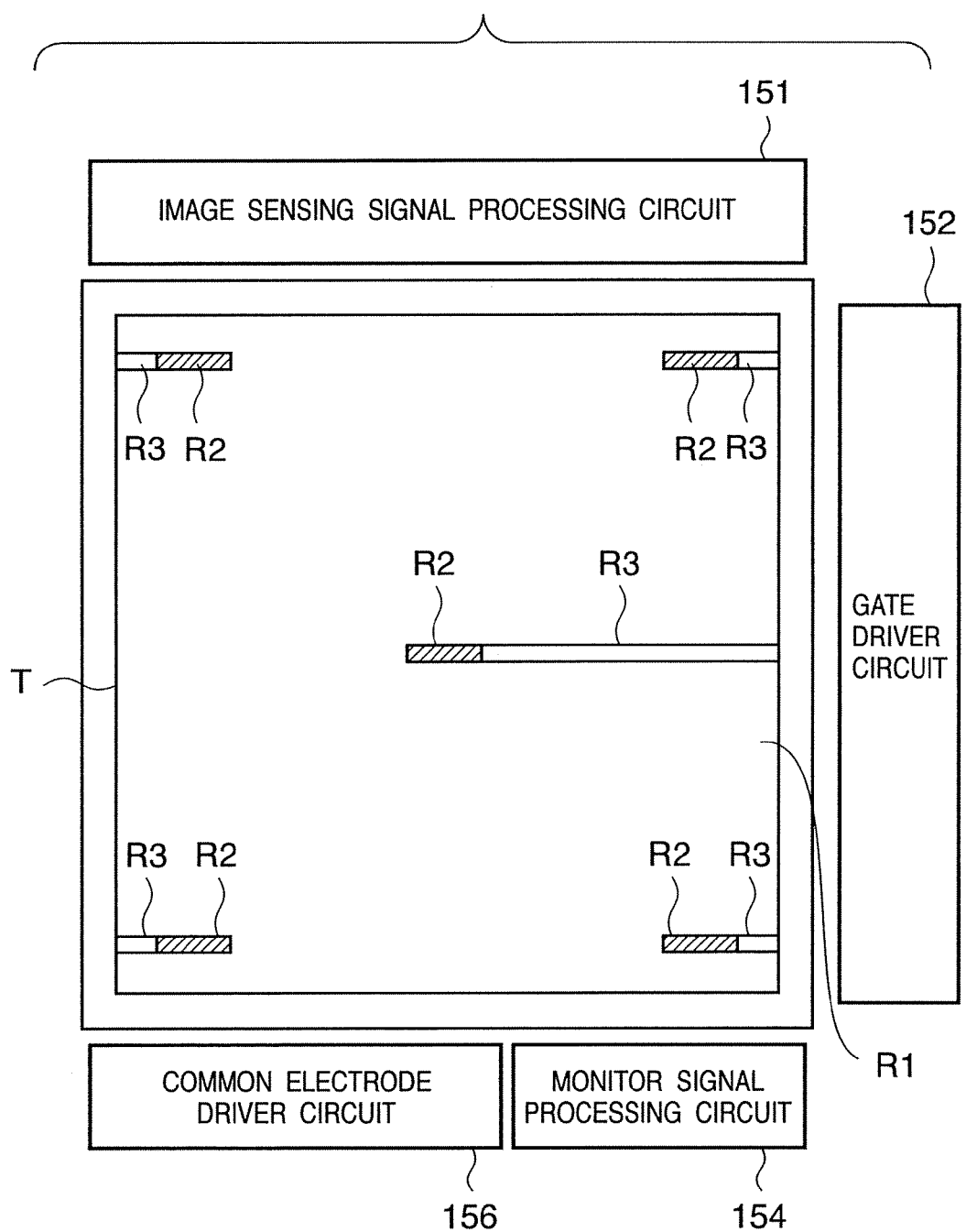
FIG. 24 is a layout diagram showing the overall arrangement of a radiation image sensing apparatus according to the sixth embodiment of the present invention.
Figure 25:
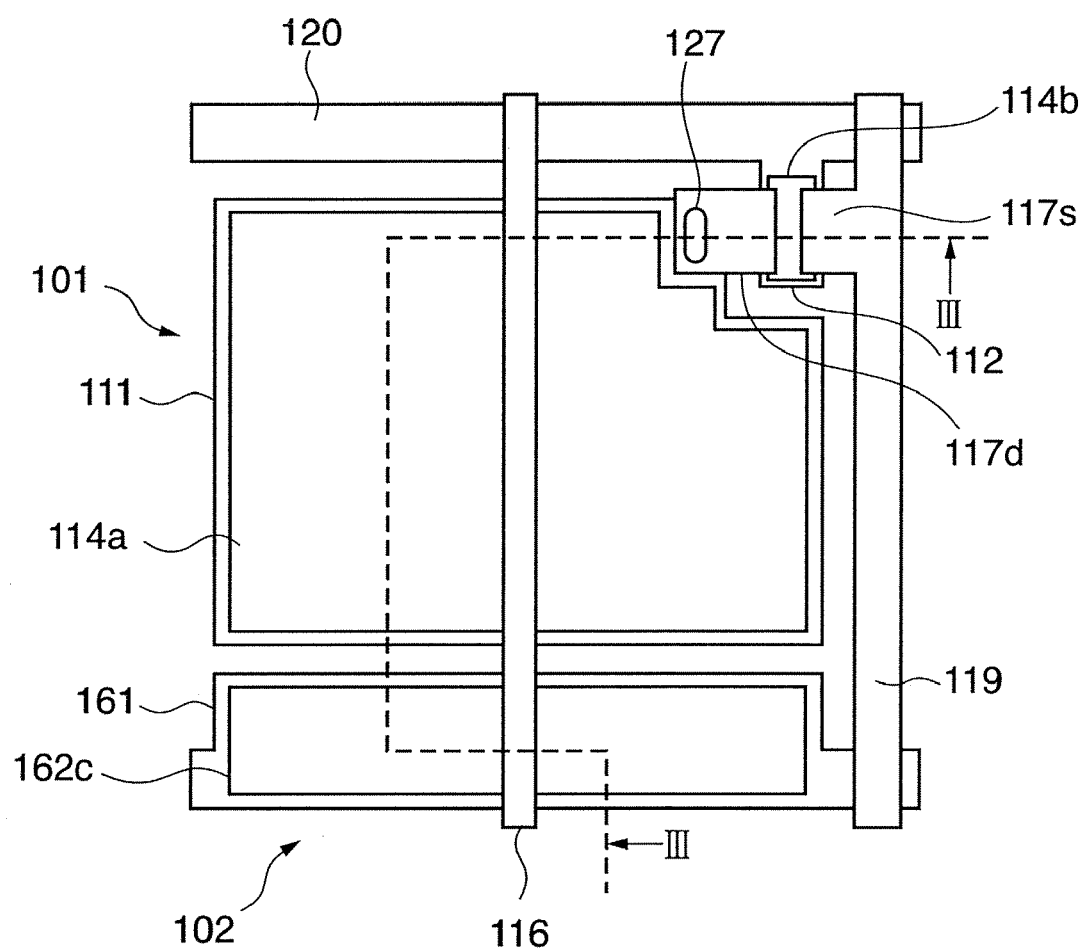
FIG. 25 is a layout diagram showing the planar structure of a pixel of the radiation image sensing apparatus according to the sixth embodiment, which has a monitor photoelectric conversion element.
Figure 26:
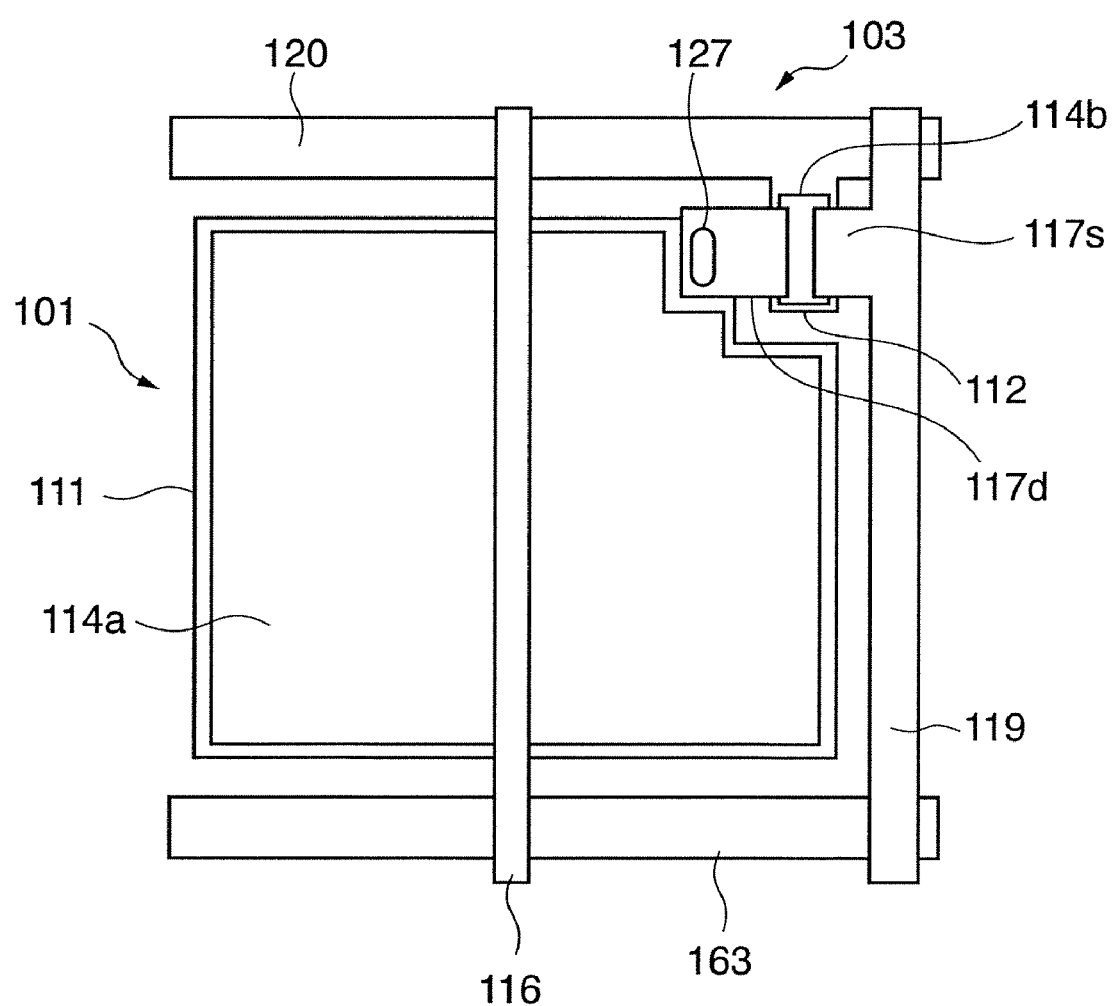
FIG. 26 is a layout diagram showing the planar structure of a pixel of the radiation image sensing apparatus according to the sixth embodiment, which has lead interconnections for a monitor photoelectric conversion element.
Figure 27:
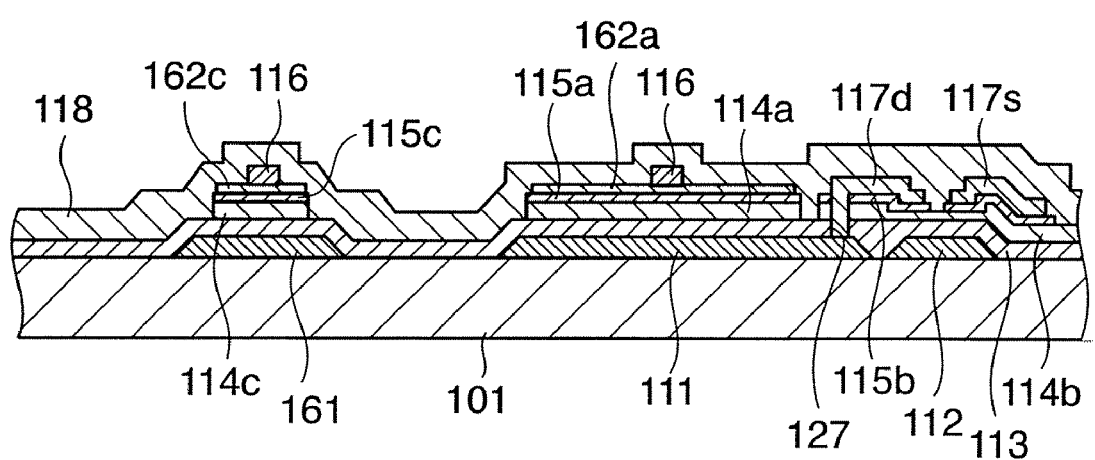
FIG. 27 is a sectional view taken along a line III-III in FIG. 25.

The sixth embodiment of the present invention will be described next. In the fifth embodiment, the monitor photoelectric conversion element 102 is a TFT sensor. In this embodiment, a monitor photoelectric conversion element 102 is a MIS sensor. In a MIS sensor, the voltage between two electrodes varies due to the influence of electrons and holes generated in a semiconductor layer when visible light is incident. The variation in voltage is read, or a variation in current based on the variation in voltage is read. FIG. 24 is a layout diagram showing the overall arrangement of a radiation image sensing apparatus according to this embodiment. FIG. 25 is a layout diagram showing the planar structure of a pixel of the radiation image sensing apparatus according to this embodiment, which has a monitor photoelectric conversion element. FIG. 26 is a layout diagram showing the planar structure of a pixel of the radiation image sensing apparatus according to this embodiment, which has lead interconnections for a monitor photoelectric conversion element. FIG. 27 is a sectional view taken along a line III-III in FIG. 25.

In this embodiment, areas R1, R2, and R3 are arranged in a conversion section (pixel area) T, as in the fifth embodiment. However, the layout is different from the fifth embodiment, as shown in FIG. 24. In this embodiment, the area R3 is laid out in a direction in which a gate line 120 runs with respect to the area R2. In addition, neither a power supply 153 nor a gate driver circuit 155 is arranged. This is because the monitor photoelectric conversion element 102 is a MIS sensor. In this embodiment, monitor photoelectric conversion elements are formed in 3 (rows)×20 (columns) pixels in each area R2.

In this embodiment, the sectional structures of an image sensing photoelectric conversion element 101 and switching TFT 103 are the same as in the fifth embodiment except that a transparent electrode 162a is formed between an ohmic contact layer 115a and a common electrode bias line 116 in the image sensing photoelectric conversion element 101, as shown in FIG. 27. That is, in this embodiment, the upper electrode (first electrode) has a multilayered structure of an ohmic contact layer and transparent electrode. The structure of a pixel which has neither a monitor photoelectric conversion element nor lead interconnections therefor is the same as in the fifth embodiment.

On the other hand, in a pixel having a monitor photoelectric conversion element, as shown in FIG. 25, in addition to a sensor electrode 111 of the image sensing photoelectric conversion element 101 and a control electrode (gate electrode) 112 of the switching TFT 103, a lower electrode 161 of the monitor photoelectric conversion element 102 is formed on an insulating substrate 110. These electrodes are covered with a first insulating film 113. In this embodiment, the monitor photoelectric conversion element 102 is laid out to be adjacent to the image sensing photoelectric conversion element 101 in the pixel along the direction in which the common electrode bias line 116 runs. This pixel will be compared with the pixel which has neither a monitor photoelectric conversion element nor lead interconnections therefor (the pixel shown in FIGS. 14 and 17). The shapes and areas of the pixels are the same. In the pixel shown in FIG. 25, since the lower electrode 161 is formed, the sensor electrode 111 and the like are smaller.

In the monitor photoelectric conversion element 102, as shown in FIG. 27, a semiconductor layer (photoelectric conversion layer) 114c is formed on the insulating film 113 to be aligned with the lower electrode 161. An ohmic contact layer 115c and transparent electrode 162c are formed on the semiconductor layer 114c. An upper electrode (second electrode) is formed from the ohmic contact layer 115c and transparent electrode 162c. The common electrode bias line 116 is formed on the transparent electrode 162c. The common electrode bias line 116 is covered with a second insulating film 118.

A pixel having the above structure is present in the area R2 shown in FIG. 24.

A pixel having lead interconnections for a monitor photoelectric conversion element has an interconnection 163 for the lower electrode 161, as shown in FIG. 26. The interconnection 163 runs in parallel to the gate line 120. The interconnection 163 is laid out to be adjacent to the image sensing photoelectric conversion element 101 in the pixel along the direction in which the common electrode bias line 116 runs. This pixel will be compared with the pixel which has neither a monitor photoelectric conversion element nor lead interconnections therefor (the pixel shown in FIGS. 14 and 17). The shapes and areas of the pixels are the same. In the pixel shown in FIG. 26, since the interconnection 163 is formed, the sensor electrode 111 and the like are smaller. The interconnection 163 is connected between pixels that are adjacent and are located at the outermost portion of the conversion section T. That is, when an array of pixels that share the gate line 120 is defined as a "row", all or some of the lower electrodes 161 of the monitor photoelectric conversion elements 102 arranged on the same row are connected to each other through the interconnection 163. The lower electrodes 161 are led to the outside of the panel by the interconnection 163.

A pixel having the above structure is present in the area R3 shown in FIG. 24.

A method of driving the radiation image sensing apparatus according to this embodiment, which has the above-described arrangement, will be described next.

First, the depletion voltage of the semiconductor layers 114a and 114c is applied from a common electrode driver circuit 156 to the common electrode bias line 116 to increase the electron/hole collection efficiency.

In this state, the phosphor layer (not shown) is irradiated with X-rays. The photoelectric conversion section is irradiated with visible light from the phosphor layer. The visible light absorbed by the monitor photoelectric conversion element 102 is converted into charges. A potential variation of the monitor photoelectric conversion element 102 based on the charges or a current value based on the potential variation is transported to a monitor signal processing circuit 154. For this reason, the potential variation or current value can be measured in real time as an X-ray dose.

When the X-ray dose measured by the monitor signal processing circuit 154 reaches a set value, a signal is sent to the X-ray generator (radiation source) to stop X-ray irradiation. Immediately after that, the operating voltage of the TFT 103 is sequentially applied to the gate lines 120 of the TFTs 103, thereby reading charges stored in the capacitors of the image sensing photoelectric conversion elements 101 from signal lines 119.

After that, a forward voltage is applied to the semiconductor layer 114a of the image sensing photoelectric conversion element 101 through the common electrode bias line 116. Accordingly, a refresh operation is performed. That is, all charges stored in the interface between the insulating film 113 and the semiconductor layer 114a in the image sensing photoelectric conversion element 101 in correspondence with the X-ray dose are removed.

A voltage with which a forward voltage is applied to the semiconductor layer 114c in accordance with the voltage applied to the common electrode bias line 116 is applied to the lower electrode 161 of the monitor photoelectric conversion element 102 in advance. When this voltage is applied to the lower electrode 161 in advance, a voltage for the refresh operation of the image sensing photoelectric conversion element 101 is applied to the transparent electrode 162c of the monitor photoelectric conversion element 102 connected to the common electrode bias line 116. Simultaneously, the forward voltage is also applied to the semiconductor layer 114c in the monitor photoelectric conversion element 102. Hence, the refresh operation for the monitor photoelectric conversion element 102 is also executed.

In the refresh operation, not all the stored charges but some of them may be removed. A voltage that decreases a depletion bias may be applied to the common electrode bias line 116. In the refresh operation, the voltage of the lower electrode 161 may be controlled to set a state to easily remove the charges.

When a MIS sensor is used as the monitor photoelectric conversion element 102, it may be laid out to be adjacent to the image sensing photoelectric conversion element 101 in the pixel along the direction in which the gate line 120 runs. The transparent electrode 162c may be connected to the power supply. The lower electrode 161 may be connected to the monitor signal processing circuit 154. In this structure, however, a lead interconnection for the transparent electrode 162c and a lead interconnection for the lower electrode 161 are necessary. For this reason, the light-receiving area (opening ratio) of the image sensing photoelectric conversion element 101 in a pixel having these interconnections may be too small.

To the contrary, according to this embodiment having the above-described arrangement, for a pixel having a lead interconnection, only one lead interconnection 163 is arranged. Hence, the light-receiving area (opening ratio) of the image sensing photoelectric conversion element 101 in this pixel is large. Additionally, in which embodiment, since a voltage is supplied from the common electrode driver circuit 156 to the lower electrode 161 through the common electrode bias line 116, no power supply is required. For this reason, the circuit can be simplified, as in the fifth embodiment.

As in the fifth embodiment, some pixels may have no image sensing photoelectric conversion elements 101 and only the monitor photoelectric conversion elements 102 and lead interconnections for the monitor photoelectric conversion elements 102 in adjacent pixels. In this case, data from the image sensing photoelectric conversion elements 101 decreases. The decrease must be compensated by image processing. This compensation can be done by a conventional image processing technique.

Alternatively, only the pixels of one line in each area R2, and for example, only 1 (row)×20 (columns) pixels or 3 (rows)×1 (column) pixels in the area R2 may have the monitor photoelectric conversion elements.

A method of manufacturing the radiation image sensing apparatus according to this embodiment will be described next. FIGS. 28A to 28D and 29A to 29D are sectional views showing steps in manufacturing the radiation image sensing apparatus according to this embodiment.

Figure 28A:
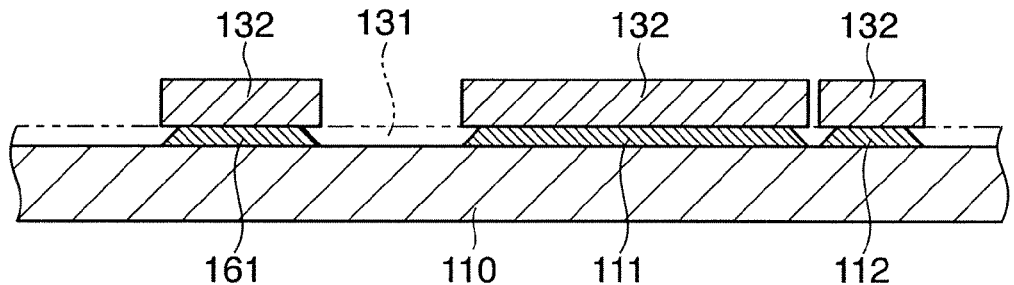
FIGS. 28A to 28D are sectional views showing a method of manufacturing the radiation image sensing apparatus according to the sixth embodiment of the present invention.

First, as shown in FIG. 28A, an AlNd film 131 serving as a first metal layer and having a thickness of 500 to 4,000 Å is formed on an insulating substrate 110 by, e.g., sputtering. An Mo film or Ta film may be formed as the first metal layer. Alternatively, a multilayered film may be formed by sequentially forming a plurality of films. Next, the AlNd film 131 is patterned by photolithography using a resist film 132 as a mask to form the sensor electrode 111, control electrode 112, gate line 120, and lower electrode 161. Etching of the AlNd film 131 is done by a wet process using an etchant containing, e.g., nitric acid, phosphoric acid, and acetic acid. After patterning, the resist film 132 is removed.

Figure 28B:
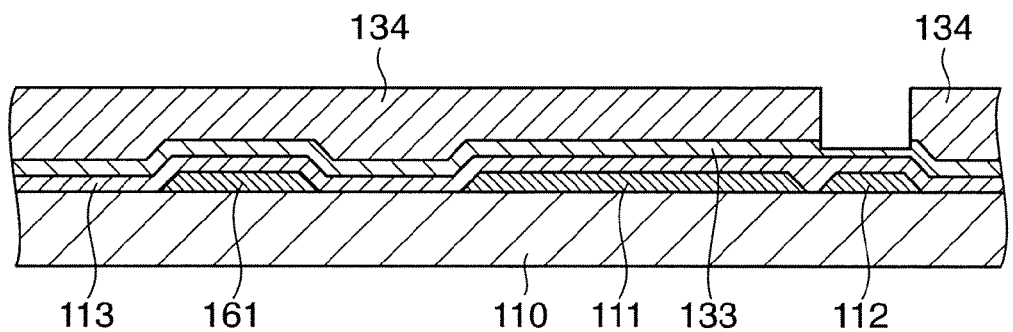

As shown in FIG. 28B, the first insulating film 113 having a thickness of 1,500 to 4,000 Å, a semiconductor layer 133 having a thickness of 2,000 to 15,000 Å, and an ohmic contact layer 134 having a thickness of 100 to 1,000 Å are continuously formed by CVD. The semiconductor layer 133 becomes the semiconductor layer (photoelectric conversion layer) 114a of the image sensing photoelectric conversion element 101, a semiconductor layer 114b of the TFT 103, and the semiconductor layer (photoelectric conversion layer) 114c of the monitor photoelectric conversion element 102. As the first insulating film 113, for example, an SiN film is used.

Then, the semiconductor layer 133 is etched not entirely but partially by only 500 to 5,000 Å by photolithography using a resist film 134 having an opening on the control electrode 112 of the TFT 103 as a mask. The semiconductor layer 133 is formed as thick as 2,000 to 15,000 Å to increase the optical absorption efficiency in the image sensing photoelectric conversion element 101 and monitor photoelectric conversion element 102. In this state, the series resistance between the source and the drain of the TFT 103 is high. Hence, the process for thinning the semiconductor layer 133 is executed to reduce the ON resistance of the TFT 103. At this time, the semiconductor layer 133 is etched by, e.g., dry etching. As dry etching, plasma etching is preferably used because a high process accuracy can be obtained while minimizing damage to the semiconductor layer 133. Chemical dry etching which can also minimize damage to the semiconductor layer 133 may be used. Alternatively, reactive ion etching at a low power (e.g., about 0.1 to 0.2 W/cm$^2$) and high pressure (e.g., about 10 to 30 Pa) may be performed. After patterning, the resist film 134 is removed.

Figure 28C:
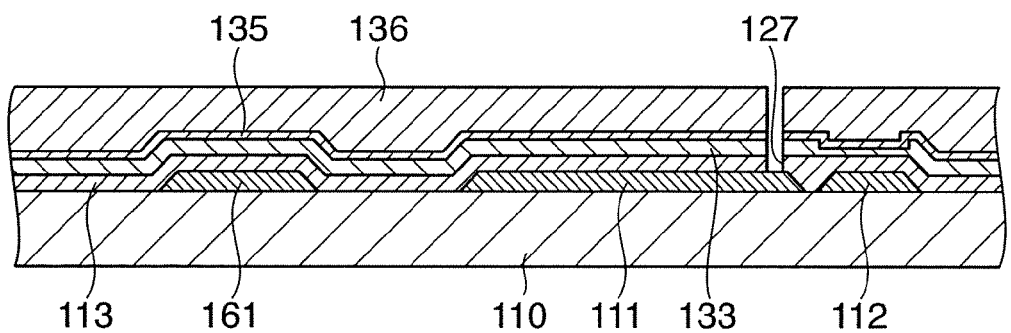

As shown in FIG. 28C, an ohmic contact layer 135 having a thickness of 100 to 1,000 Å is formed by CVD. If silicon oxide is present in the interface between the semiconductor layer 133 and the ohmic contact layer 135, a preprocess using hydrofluoric acid (e.g., about 0.1 to 10 wt %) may be executed. If an organic film is inserted, it may be removed by irradiating it with oxygen plasma. In addition, a final process using hydrogen plasma may be executed in the CVD apparatus immediately before formation of the ohmic contact layer 135.

Next, a through hole 127 is formed by photolithography using a resist film 136 as a mask. The through hole 127 electrically connects a drain electrode 117d of the TFT 103 to the sensor electrode 111 of the image sensing photoelectric conversion element 101. Charges generated when the light-receiving portion absorbs visible light are read, through the drain electrode 117d, from the sensor electrode 111 capacitively coupled to the light-receiving portion.

To improve the coverage of a metal film to be formed later, chemical dry etching is preferably performed to form a hole having a tapered section. If the coverage of the metal film need not be taken into consideration, the process accuracy may be increased by reactive ion etching. Alternatively, the hole may be formed by plasma etching. After patterning, the resist film 136 is removed.

Figure 28D:
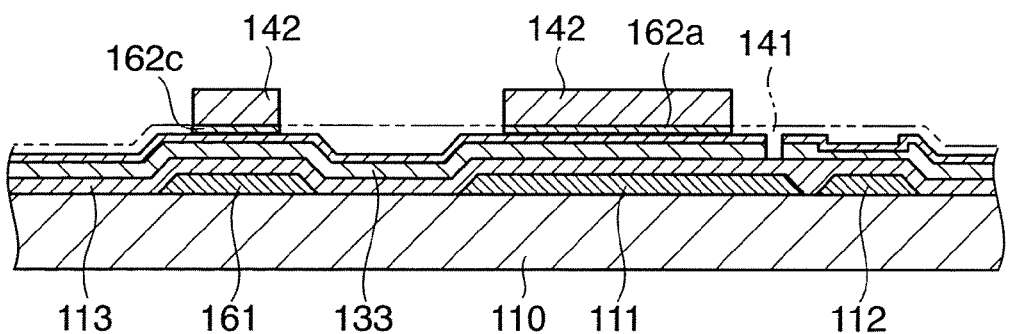

As shown in FIG. 28D, an ITO film 141 serving as a transparent electrode film having a thickness of 100 to 1,000 Å is formed by sputtering. The ITO film 141 is patterned by photolithography using a resist film 142 as a mask to form the transparent electrodes 162a and 162c. In this etching, an organic-acid-based etchant such as oxalic acid that does not damage the AlNd film 131 exposed to the through hole portion is preferably used.

When the ohmic contact layers 115a and 115c are formed from a film such as a microcrystalline $n^+$-film having a low resistivity, the process from formation to patterning of the ITO film 141 may be omitted because the ohmic contact layers 115a and 115c function as the upper electrode.

Figure 29A:
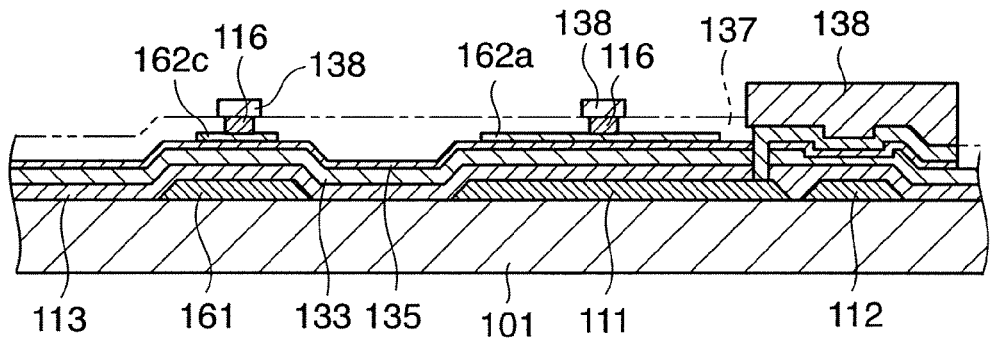
FIGS. 29A to 29D are sectional views showing the method of manufacturing the radiation image sensing apparatus according to the sixth embodiment of the present invention, which show the steps next to those shown in FIGS. 28A to 28D.

As shown in FIG. 29A, an Al film 137 serving as a second metal layer and having a thickness of 1,000 to 10,000 Å is formed by, e.g., sputtering. An Mo film or Ta film may be formed as the second metal layer. Alternatively, a multilayered film may be formed by sequentially forming a plurality of films. If an oxide film is formed on the surface of the through hole 127, and satisfactory connection to the through hole 127 cannot be ensured, a process for removing the oxide film by reverse sputtering is inserted before formation of the Al film 137.

The Al film 137 is patterned by photolithography using a resist film 138 as a mask to form the common electrode bias line 116. Etching of the Al film 137 is done by a wet process using an etchant containing, e.g., nitric acid, phosphoric acid, and acetic acid. Hence, the Al film 137 is etched slightly inward under the resist film 138. In this patterning, the Al film 137 in regions where the source electrode 117s, drain electrode 117d, and signal line 119 are to be formed is masked by the resist film 138 to prevent etching in this process. After patterning, the resist film 138 is removed.

In this etching process, the transparent electrodes 162a and 162c are preferably crystallized by annealing in advance to prevent any damage to the transparent electrodes 162a and 162c made of the exposed ITO film 141.

After the common electrode bias line 116 is formed by patterning, the ITO film 141 may be formed and patterned to form the transparent electrodes 162a and 162c. In this case, the transparent electrodes 162a and 162c are formed to cover the common electrode bias line 116.

Figure 29B:
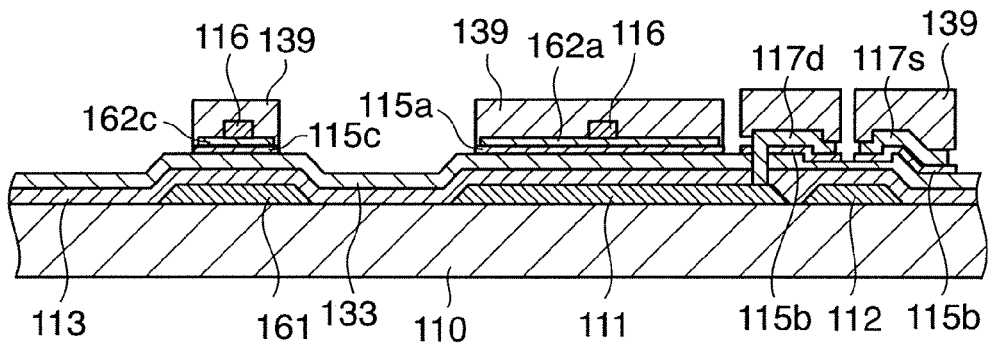

After that, as shown in FIG. 29B, the Al film 137 is patterned by photolithography using a new resist film 139 as a mask to form the source electrode 117s, drain electrode 117d, and signal line 119. Etching of the Al film 137 is done by a wet process using an etchant containing, e.g., nitric acid, phosphoric acid, and acetic acid. Hence, the Al film 137 is etched slightly inward under the resist film 139.

At this time, the common electrode bias line 116 that has already been formed is masked by the resist film 139 to prevent etching in this process. In addition, to prevent the transparent electrode 162a and ohmic contact layer 135 in the opening region of the image sensing photoelectric conversion element 11 from being removed by dry etching of the next process, not only the common electrode bias line 116 but also the entire opening region of the image sensing photoelectric conversion element 101 is masked by the resist film 139.

As shown in FIG. 29B, dry etching is performed using the resist film 139 as a mask to remove the gap portions of the TFT 103, i.e., the ohmic contact layer 135 between the sources and the drains, thereby forming ohmic contact layers 115a to 115c.

Figure 29C:
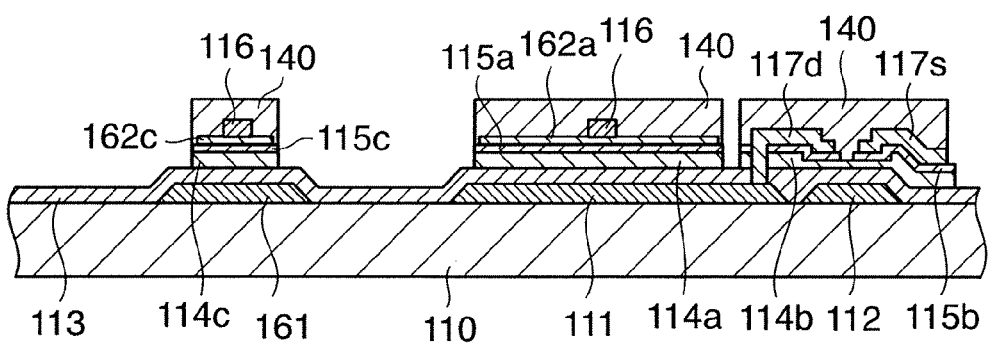

As shown in FIG. 29C, unnecessary portions of the semiconductor layer 133 and ohmic contact layer 135 are removed by photolithography using a resist film 140 as a mask to define the opening region of the image sensing photoelectric conversion element 101 and form the semiconductor layers 114a to 114c. After patterning, the resist film 140 is removed.

The unnecessary portions of the first insulating film 113 are not removed in this embodiment. However, they may be removed. When the first insulating film 113 is left without being removed, the etching process for removing the unnecessary portions of the semiconductor layer 133 and ohmic contact layer 135 is preferably executed by using plasma etching in order to ensure the process accuracy because the selectivity ratio between the semiconductor layer 133 and the SiN film that constitutes the first insulating film 113 can readily be ensured in plasma etching.

Figure 29D:
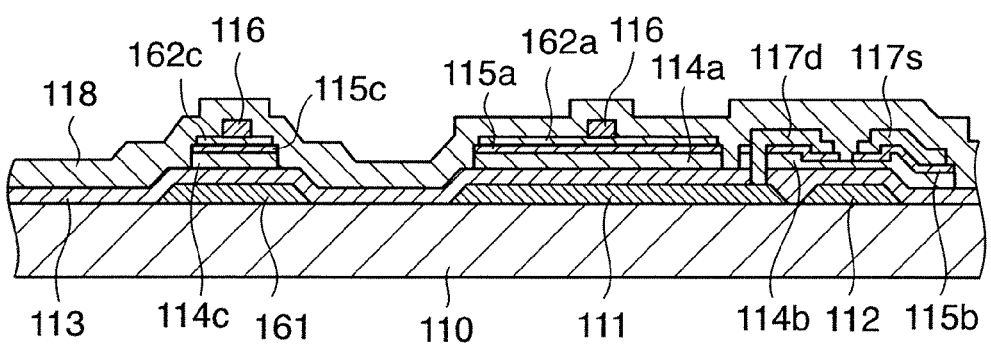

As shown in FIG. 29D, the second insulating film 118 serving as a protective film and having a thickness of 2,000 to 10,000 Å is formed by CVD. As the second insulating film 118, for example, an SiN film can be formed. In this way, the image sensing photoelectric conversion element 101, monitor photoelectric conversion element 102, and TFT 103 can be formed.

A phosphor layer (not shown) is formed. To ensure electrical connection, the protective film at the periphery is removed by patterning and dry etching using photolithography. Thus, a radiation image sensing apparatus can be completed.

In the present invention, the position of the monitor photoelectric conversion element 102 (second semiconductor conversion element) in a pixel is not particularly limited. A TFT sensor as in the fifth embodiment may be arranged in the way of this embodiment. Alternatively, a MIS sensor as in this embodiment may be arranged in the way of the fifth embodiment.

According to the fifth and sixth embodiments, the second semiconductor conversion element is formed on the same substrate as that of the first semiconductor conversion element. Hence, the entire apparatus can be made compact and lightweight. In addition, AEC can be executed on the basis of a radiation dose detected through the second semiconductor conversion element. Since radiation is not attenuated by the second semiconductor conversion element, an image having a high image quality can be obtained.

The present invention is not limited to each of the first to sixth embodiments. The embodiments may be appropriately combined. For example, in the arrangement (first to fourth embodiments) having an image read sensor formed on the same layer as that of the second conversion element (AEC sensor or radiation monitor sensor), the electrode (the interconnection connected to the electrode) of the second conversion element and the control electrode (the interconnection connected to the electrode) of the switch element may be commonly connected, as described in the fifth and sixth embodiments. According to this arrangement, the interconnection structure becomes simpler. In addition, the light-receiving areas of both of the first conversion element for image reading and the second conversion element for AEC and/or radiation monitor can be increased.

As many apparently widely different embodiments of the present invention can be made without departing from the spirit and scope thereof, it is to be understood that the invention is not limited to the specific embodiments thereof except as defined in the appended claims.

What is claimed is:

1. A radiation image sensing apparatus for sensing a radiation by a sensing unit and outputting an electric signal corresponding to the sensed radiation, wherein said sensing unit comprising:

an insulating substrate;

a conversion section arranged over the insulating substrate and, configured to have a first semiconductor conversion element for converting the radiation into an electrical signal and a switch element connected to the first semiconductor conversion element; and a second semiconductor conversion element arranged over the insulating substrate, configured to convert the radiation into an electrical signal for detecting a dose of the radiation incident on the conversion section, wherein the first semiconductor conversion element and the second semiconductor conversion element are arranged over the switch element which is arranged over the insulating substrate.

2. The apparatus according to claim 1, wherein each of the first and second semiconductor conversion elements has a MIS structure.

3. The apparatus according to claim 1, wherein the second semiconductor conversion element has a structure of a field effect transistor.

4. The apparatus according to claim 1, wherein each of the first and second semiconductor conversion elements has a PIN structure.

5. The apparatus according to claim 1, further comprising:

a wavelength conversion member which arranged above the first and second semiconductor elements to convert a wavelength of radiation that becomes incident.

6. A method of manufacturing a radiation image sensing apparatus having:

an insulating substrate, a conversion section which is arranged over the insulating substrate and has a first semiconductor conversion element that converts radiation into an electric signal and a switch element connected to the first semiconductor element, and a second semiconductor conversion element which is arranged over the insulating substrate to detect a total dose of radiation incident on the conversion section and converts the radiation into an electrical signal, comprising the steps of:

forming the switch element over the insulating substrate; and forming a semiconductor layer of the first semiconductor conversion element and a semiconductor layer of the second semiconductor conversion element simultaneously from the same layer formed over the switch element which is arranged over the insulating layer.

7. The apparatus according to claim 1, wherein a semiconductor layer of the first semiconductor conversion element and a semiconductor layer of the second semiconductor conversion element are formed from a common semiconductor layer arranged over the switch element.

* * * * *